US008632080B2

(12) United States Patent
Russell et al.

(10) Patent No.: US 8,632,080 B2
(45) Date of Patent: Jan. 21, 2014

(54) CHILD CARRIER ASSEMBLY FOR A SHOPPING CART

(75) Inventors: Joseph W. Russell, Frankfort, IL (US); Eleobardo Moreno, St. John, IN (US)

(73) Assignee: Sittin-Safe, LLC, Frankfort, IL (US)

( * ) Notice: Subject to any disclaimer, the term of this patent is extended or adjusted under 35 U.S.C. 154(b) by 0 days.

(21) Appl. No.: 13/214,946

(22) Filed: Aug. 22, 2011

(65) Prior Publication Data

US 2011/0304111 A1 Dec. 15, 2011

Related U.S. Application Data

(63) Continuation of application No. 11/927,049, filed on Oct. 29, 2007, now Pat. No. 8,002,290, which is a continuation-in-part of application No. 11/438,952, filed on May 23, 2006, now Pat. No. 7,287,764, which is a continuation of application No. 10/754,241, filed on Jan. 9, 2004, now Pat. No. 7,063,337.

(51) Int. Cl.
*B62D 39/00* (2006.01)

(52) U.S. Cl.
USPC .................................................. 280/33.993

(58) Field of Classification Search
USPC ...................................... 280/33.991–33.993
See application file for complete search history.

(56) References Cited

U.S. PATENT DOCUMENTS 5,630,599 A * 5/1997 Adamson et al. ........ 280/33.993

FOREIGN PATENT DOCUMENTS

CA 2210416 C 1/1999

OTHER PUBLICATIONS

Catherine Grandclement; "Wheeling Food Products Around the Store . . . and Away: The Invention of the Shopping Cart, 1936-1953"; 2006; pp. 1-29; No. 0006; Centre de Sociologie de l'Innovation; Paris France.
Canadian Patent Office, Office Action dated May 31, 2012 (1 page).

* cited by examiner

*Primary Examiner* — Jeffrey J Restifo
*Assistant Examiner* — Erez Gurari
(74) *Attorney, Agent, or Firm* — Neal, Gerber & Eisenberg LLP

(57) ABSTRACT

A child seat assembly for use in a shopping cart and secured to the hinged rear gate of the shopping cart that is configured for lifting to expose a rear opening for nesting like carts. The child seat is secured in the lower one-third portion of the shopping cart rear wall height by hinged connections, such that the seat assembly is movable between a use and a non-use configuration, and the seat assembly is suspended in position by a strut member connected to the seat back and the rear gate at a position above the seat bottom.

11 Claims, 19 Drawing Sheets

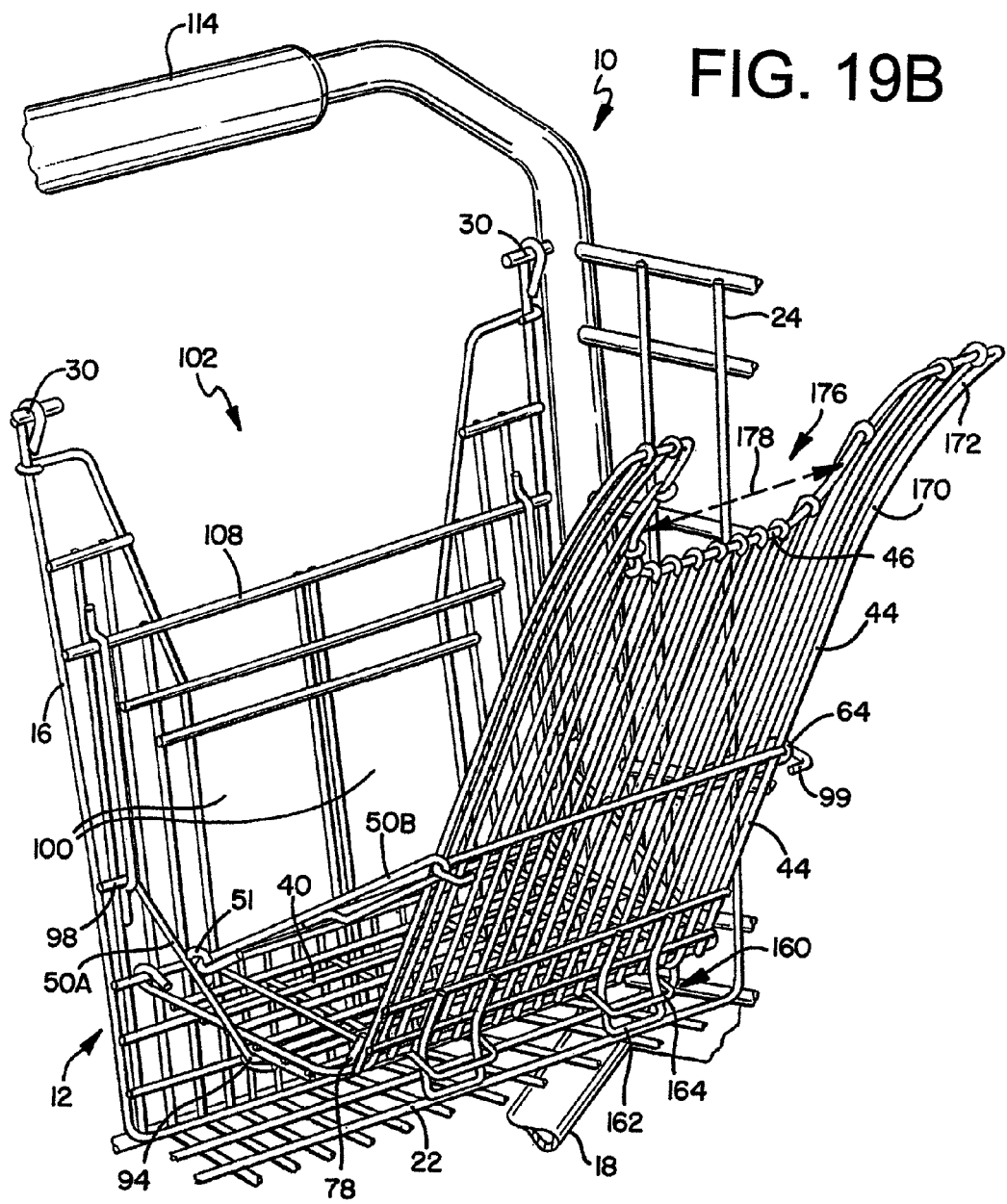

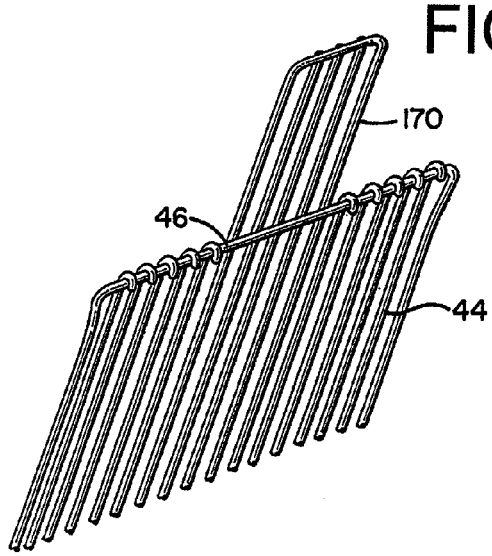
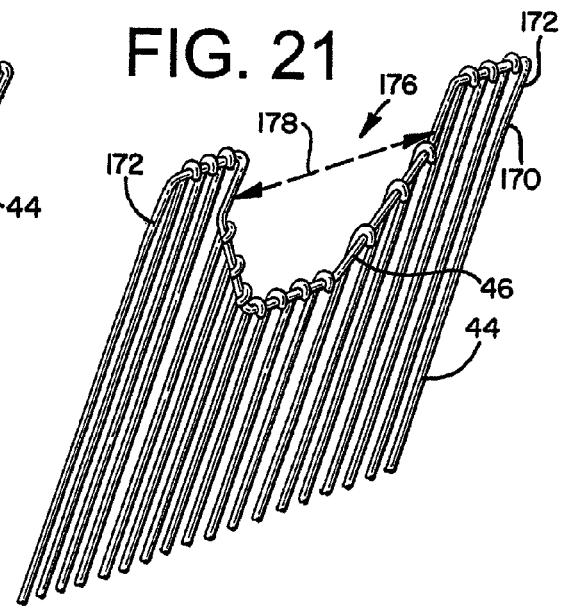
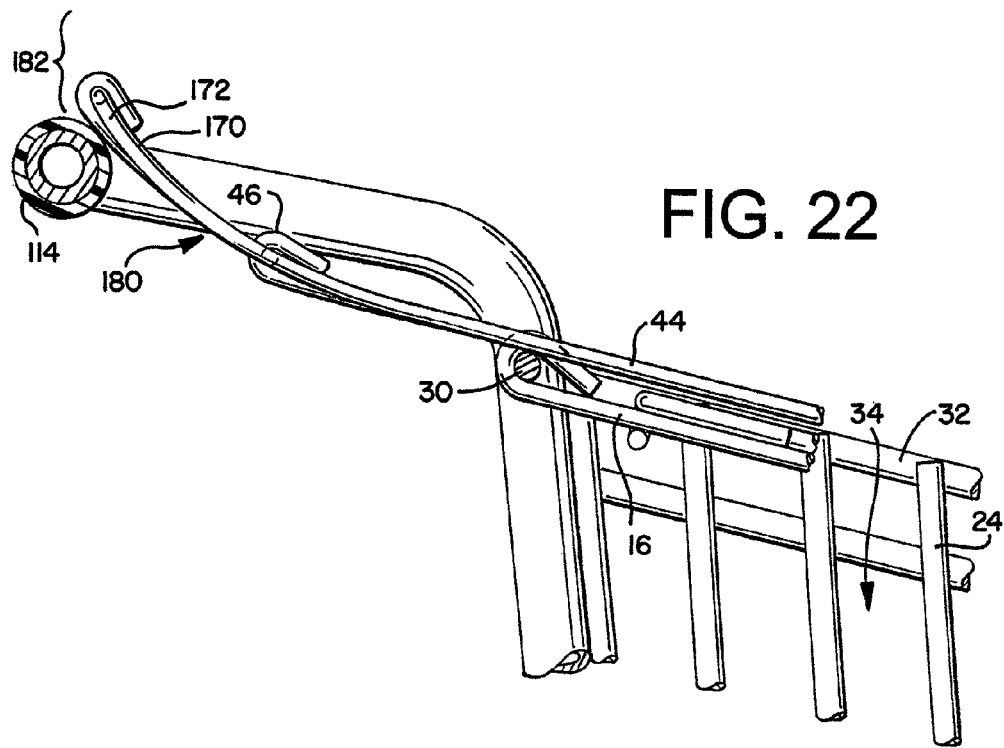

CHILD CARRIER ASSEMBLY FOR A SHOPPING CART

CROSS-REFERENCE TO RELATED APPLICATIONS

This application Claims the benefit of and is a Continuation application of U.S. Utility patent application Ser. No. 11/927,049, filed Oct. 29, 2007 (to issue on Aug. 23, 2011 as U.S. Pat. No. 8,002,290), which is a Continuation-In-Part application of U.S. Utility patent application Ser. No. 11/438,952, filed May 23, 2006 (which issued on Oct. 30, 2007 as U.S. Pat. No. 7,287,764), and a Continuation application of U.S. Utility application Ser. No. 10/754,241, filed Jan. 9, 2004 (which issued on Jun. 20, 2006 as U.S. Pat. No. 7,063,337), and are expressly incorporated herein by reference and made a part hereof.

TECHNICAL FIELD

The present invention relates to a child seat assembly for a shopping cart. More specifically, the invention described herein relates to a collapsible child seat assembly secured to the rear gate of a shopping cart to provide a lowered center of gravity for safety of a child placed in the seat, and yet also providing ease of movement to use and non-use configurations.

BACKGROUND OF THE INVENTION

Shopping carts are often equipped with child carriers, providing a large chamber for carrying groceries or the like, and a seat for carrying a small child, or to hold a portable baby carrier such as the removable portion of a car seat assembly. Because of the large number of shopping carts that must be available in a store, it is necessary for the shopping carts to stack together in nesting arrangement. Nesting of the carts together results in like carts being inserted into one another to place at least a portion of the basket of one cart into that of another. Typically, this type of design includes a gated rear wall for the basket chamber, which lifts by the force of a basket of another cart being pushed against the gated wall, providing passage of the forced cart. It is important that the child seat of such a cart will not obstruct the ability for stacking of carts together, yet be readily accessible for the user to deploy for his or her child. This limitation of the device, to permit stacking of carts yet have an accessible child seat, poses a significant obstacle for designing a suitable device.

U.S. Pat. Nos. 2,813,725; 2,931,662; and, 2,890,059. The shopping cart devices of these patents, dating back to the introduction of the features in the 1950's, are very similar to the current popular cart and child seat devices. Some modifications to this design of cart devices have been introduced, such as that which disclosed in U.S. Pat. No. 5,020,811, without departure from the overall design and arrangement of the child seat mounted in a shopping cart.

More recently, there have been child seat designs introduced that address needed redesigns by placement of the child seat outside the shopping cart, providing the option of still utilizing the popular type of shopping cart as developed in the 1950's. Examples of these more recent devices with the seat secured outside the cart basket are depicted in U.S. Pat. Nos. 5,823,548 and 5,918,891 In the '548 patent, a conventional shopping cart is utilized, with attachment of a carrier to the rear of the cart. The design of the '548 patent, however, will not permit stacking of carts together, since the rear attachment blocks access to the rear gate of the cart. The '891 patent, on the other hand, provides a child seat mounted to extend outside the cart basket, and below the rear gate of the cart. Further, the '891 patent describes a child seat positioned outside the basket that also has a low center of gravity due to the seat bottom being located below the bottom of the cart basket, outside the basket itself.

Though various designs of shopping carts have been introduced through the years, it has been found that the industry is resistant to material departure from the conventional design of cart and child carrier. Aside from some level of use of the '548 patented device, there is an apparent resistance for the industry to embrace new design choices that depart from the popular design in use since the 1950's. This popular shopping cart design is constructed with a lower frame and a rectangular basket chamber that is narrow at one end and widens at the opposite end, usually at the rear portion of the cart. Front and rear casters secured to the bottom of the frame to provide mobility of the cart, and a handle is provided at the rear of the cart for the user to push the cart. The basket has a central chamber made up of basket walls and a gate pivotally mounted to serve as a rear wall, such that carts of similar design may be nested together whereby a second cart is pushed into the back of the first cart. Child seats for this type of cart usually have a secondary back wall structure that moves forward and rests in a forward position forming a V-shaped rear wall configuration. Popular versions of this type of cart design has a rear wall made of wire or plastic lattice, and the secondary wall being made up of an elongated support member secured to the bottom of the rear wall and extending to the top edge regions of the cart. The support member is secured at the bottom by a hinge that permits the support member to be deployed away from the wall to form a large V-shaped arrangement between the rear wall and the support member. A seat platform is attached so that it may be deployed to thereby be located between the diverging rear wall and the support member. Examples of this type of cart and child carrier device is shown at manufacturer web sites, such as the following: www.totecart.com; www.unarco.com; www.unitedsteelandwire.com; and www.technibilt.com.

This type of cart and seat assembly design, however, results in the child seat positioned with a high center of gravity, due to inherent limitations of the design. Since the seat is secured to the support member, which is deployed in a large V-configuration by pivoting about the hinge at the bottom of the rear wall, the seat must be positioned in the upper portion of the basket. The height of the seat is thereby dictated by the overall design, because the seat must be at a height in which the V-shaped rear wall configuration has ample depth to hold the seat platform between its diverging parts. This location for the child seat is believed to be potentially dangerous for children if a user were to leave a child unattended. This is due to the fact that the center of gravity for the child resides in the upper portion of the cart, and the fact that the child is seated near the open top edge of the cart basket. The resulting dangers include possibility of the cart tipping over due to unexpected and movement of the child's weight, such as a child leaning over or pulling on something outside the cart. Another potential danger results as a child not properly secured by a safety strap may lean out of the cart or even stand on the seat platform and fall to the floor. Therefore, with the current popular design of shopping cart, the user must be in constant attendance to prevent such occurrences. Depending on the circumstances of the retail environment in which the device is used, the need for constant attendance at the cart and constant attention by the user, may not be possible or practical. Neither the user or the retailer finds benefit from this required level of care and attention. And, apparent from the statistics regarding shopping cart injuries, there is a significant need for an improved device to reduce the accidents that result.

According to a report of the Consumer Products Safety Commission, between 1985 to 1996, an annual average of 21,600 children under five years of age were treated in hospital emergency rooms due to falls when in a shopping cart. The report indicated that the frequency of fall related incidents has increased from 7,800 in 1985 to more than 16,000 in 1996. This report also indicated that 66 percent of the fall victims were treated in hospitals for head injuries. And, of those treated for head injuries, more than half suffered severe injuries such as concussions and fractures.

Therefore, there is a need for a new design for a shopping cart, one that provides a nestable cart with a lower positioned collapsible child seat. There is further a need for such a shopping cart device that otherwise is very similar in operation and appearance to existing popular devices, retaining the familiar structure of a swinging rear gate and a child seat mounted on the inside of the rear gate. In short, there is a need for a shopping cart child seat that is positioned in the lower portion of the cart basket when in use, and which is secured to a rear gate in a manner configured to collapse to permit stacking together of like carts. There is further a need for such a child seat to be user-friendly and yet have the benefit of being positioned deeper within the shopping cart basket to prevent the child from falling out of the basket, while also providing a suitable location for a user to place an infant carrier (such as an infant car seat) for transporting by the shopping cart. And there is a need for a new child seat assembly, configured for locating in the lower portion of a cart basket, which is readily secured to the inside of the cart as a retrofit to an existing cart design, such as by replacing the rear gate with a newly configured seat and gate assembly. The present invention satisfies these needs.

SUMMARY OF THE INVENTION

The present invention provides an improved child seat carrier for a shopping cart, with a structure that provides increased stability for the shopping cart, and reduces the likelihood for a child to fall from the carrier, while also providing a user-friendly design that functions as traditional carts, yet with a superior design construction. It is an object of the present invention to provide a collapsible child carrier for mounting to the rear gate of the cart to position the seat bottom in the lower portion of the shopping cart basket, and preferably in the lower third or quarter of the basket height, with automatic collapse for non-use of the child seat, and ease of deployment for use.

It is also an object of the present invention to provide a child seat assembly with suspended support of the seat bottom, without the need for a support member extending from the seat bottom to the bottom of the cart back. Also, it is an object of the present invention to provide an assembly that is at least partially supported in the use position by a strut that passes between the rear gate and the seat back, and which is an articulated strut with suitable linkage between independent strut member bodies.

It is also an advantage and object of this invention to provide an assembly that is located in the lower portion of the basket chamber in the use configuration and movable to a storage configuration against the rear gate. Upper protruding bodies of the seat back facilitates closing, or collapse, of the child seat when like carts are stacked together. The cooperative structure of the strut members and interlocking members are configured to transfer the load of a force acting upon the upper protruding bodies, toward collapse the child seat into the non-use configuration.

Other advantages and aspects of the present invention will become apparent upon reading the following description of the drawings and detailed description of the invention.

BRIEF DESCRIPTION OF THE DRAWINGS

FIG. 19B is an elevated perspective view of an assembly with structure similar to FIG. 19A, with wire lattice within the upper-extending bodies at the top of the seat back;

FIG. 20 is an elevated view of the top portion of a seat back that is an alternate structure to what is shown in FIG. 19A;

FIG. 21 is an elevated perspective view of an upper portion of a seat back that is an alternate structure that is similar to that which is shown in FIG. 19A and providing a space for holding an infant carrier similar to that depicted in broken lines in FIG. 11; and, FIG. 22 is a side cross-sectional view of the upper portion of the cart and seat assembly, very similar to that which is shown in FIG. 19A, depicting the seat assembly in the non-use collapsed configuration and the rear gate raised to expose a rear opening of the cart for stacking like carts together, with a like cart being inserted in the rear opening of the cart.

DETAILED DESCRIPTION

Figure 1:
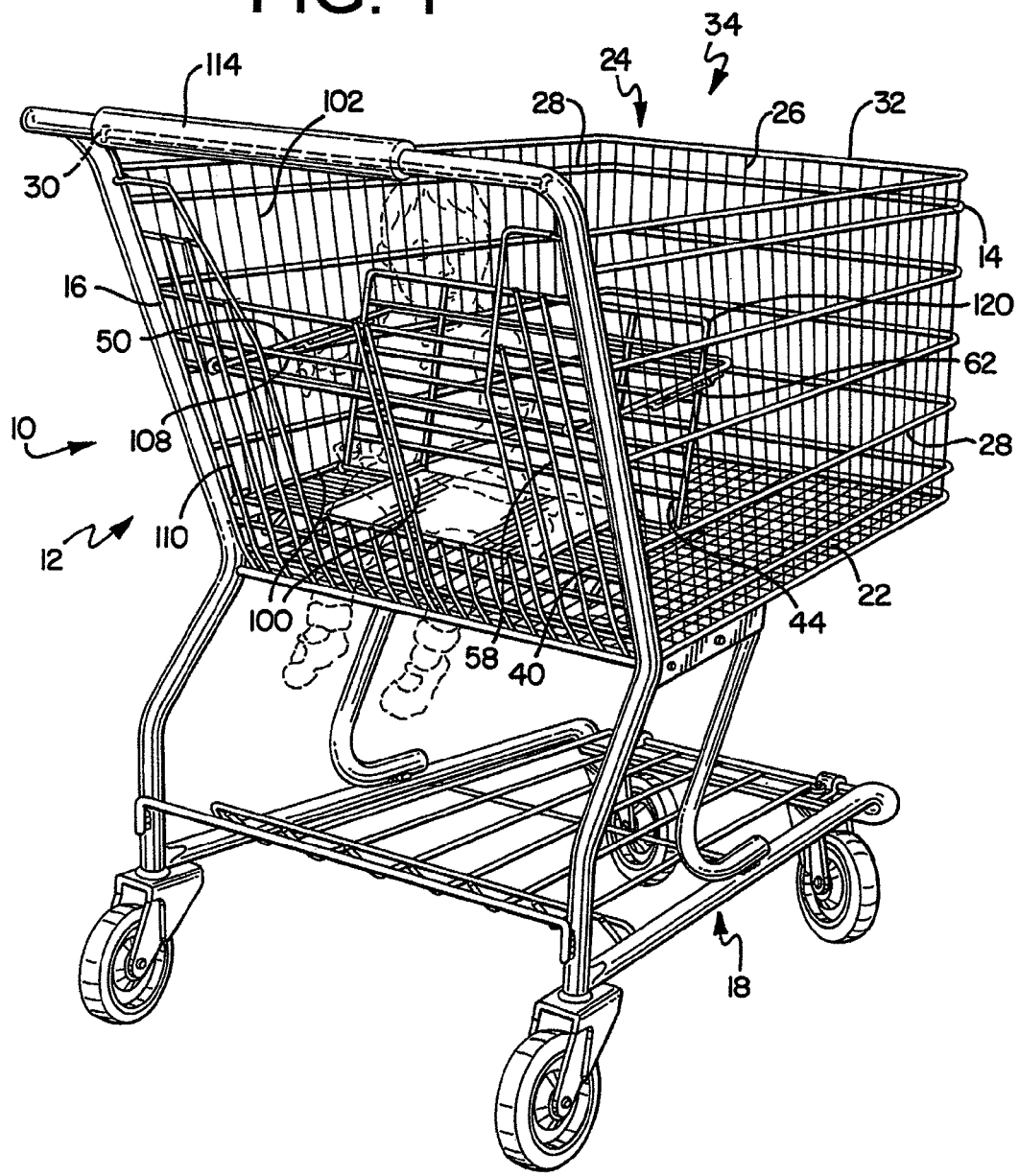
FIG. 1 is a perspective view of the shopping cart and child carrier assembly of the present invention.

The present invention provides a shopping cart and seat assembly 10 with cart child seat 12 that permits stacking of like carts together, with the child seat movable to a use position wherein the child seat has a lowered center of gravity, and positioned deep inside the shopping cart basket 14. This structure, as is described in the details herein, provides a shopping cart child seat 12 with superior features than cart and child seat assemblies previously available, while retaining the important feature of carts being capable of nesting together through the gated rear gate 16 of carts.

In a preferred embodiment of the present invention, the shopping cart 10 and child seat assembly 12 includes a cart having a lower frame 18 that supports a basket 14 for the user to carry items for purchase, and a child seat 12 that is positioned in a lower portion 20 of the cart basket 14. As with conventional cart structures, the basket 14 is formed of a sidewall arrangement and a basket bottom 22, preferably of wire or plastic mesh pattern. Since the preferred embodiment of the present invention is configured to be used with conventional cart designs, the basket sidewall arrangement 24 preferably includes a front wall 26, opposed side walls 28, and the rear gate 16. The rear gate 16 of this basket arrangement 24 is connected by a hinge 30 located at the upper portion of the basket 14. This type of shopping cart basket 14 has a basket height H-H defined by the distance between the basket bottom 22 and the upper edge 32 of the basket sidewalls 24. Therefore, the distance between the basket bottom 22 and the open top edge 32 of the basket defines the height of the basket chamber 34, which varies due to the sloping shape of the basket upper edge 32.

In the preferred form of this invention, the child seat assembly 12 is configured to be used in a popular conventional type of shopping cart. In this manner, the rear gate 16 is configured to pivot about the hinge 30 to provide an opening of the basket sidewall arrangement 24. Such pivoting movement of the rear gate 16 provides access into the basket chamber 34 for receiving a portion of the basket 14 of a like cart, for telescope nesting of similar shopping carts. The child seat 12 of the present invention is configured to be secured to the rear gate 16, though it is preferred that the rear gate 16 of the present invention has structural modifications from that of traditional carts, as is explained herein.

Figure 2:
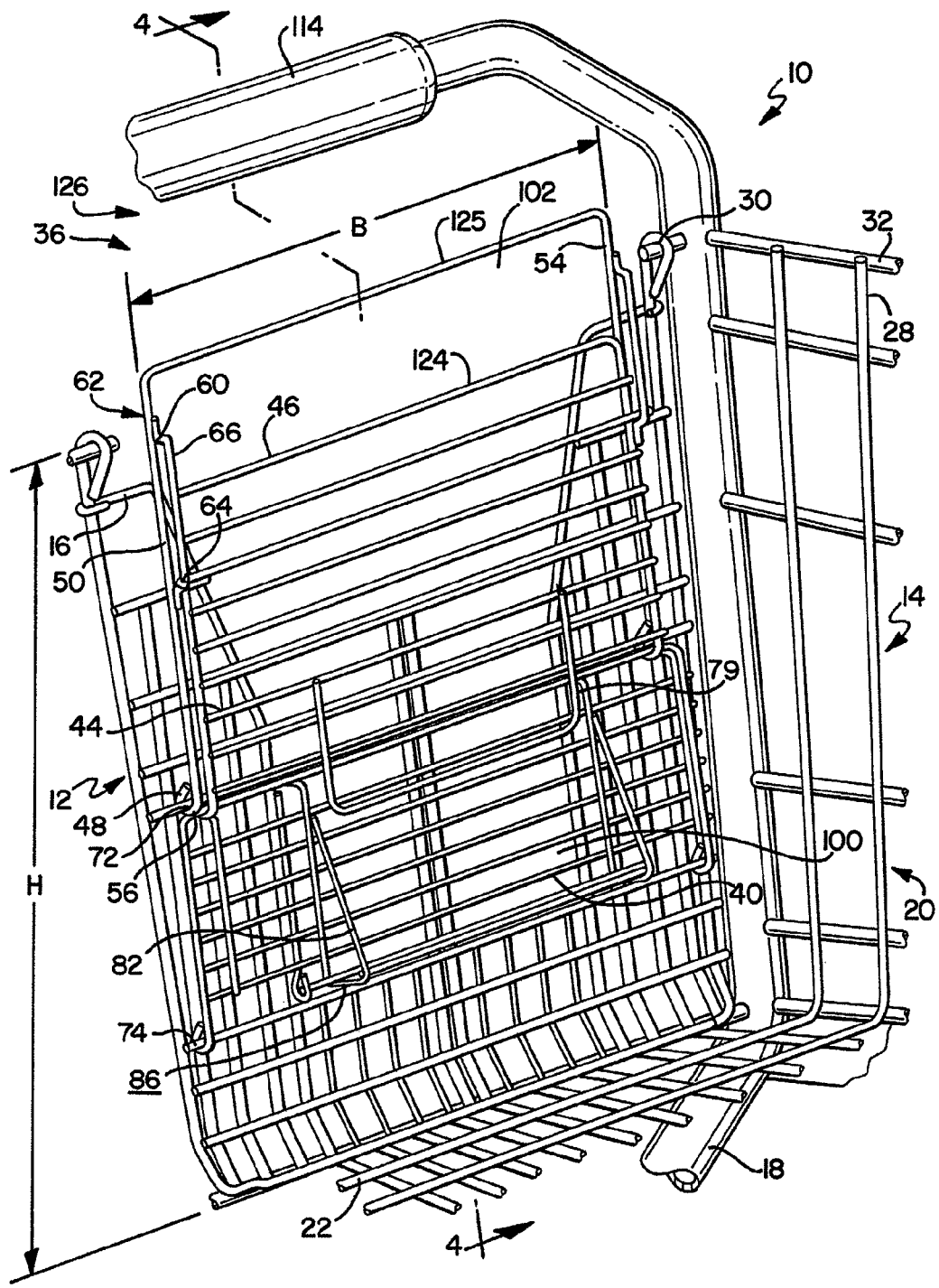
FIG. 2 is a partial sectional view of the assembly shown in FIG. 1, when the child seat assembly is moved into the non-use or storage position and is thereby positioned in tandem with the rear gate wall.
Figure 3:
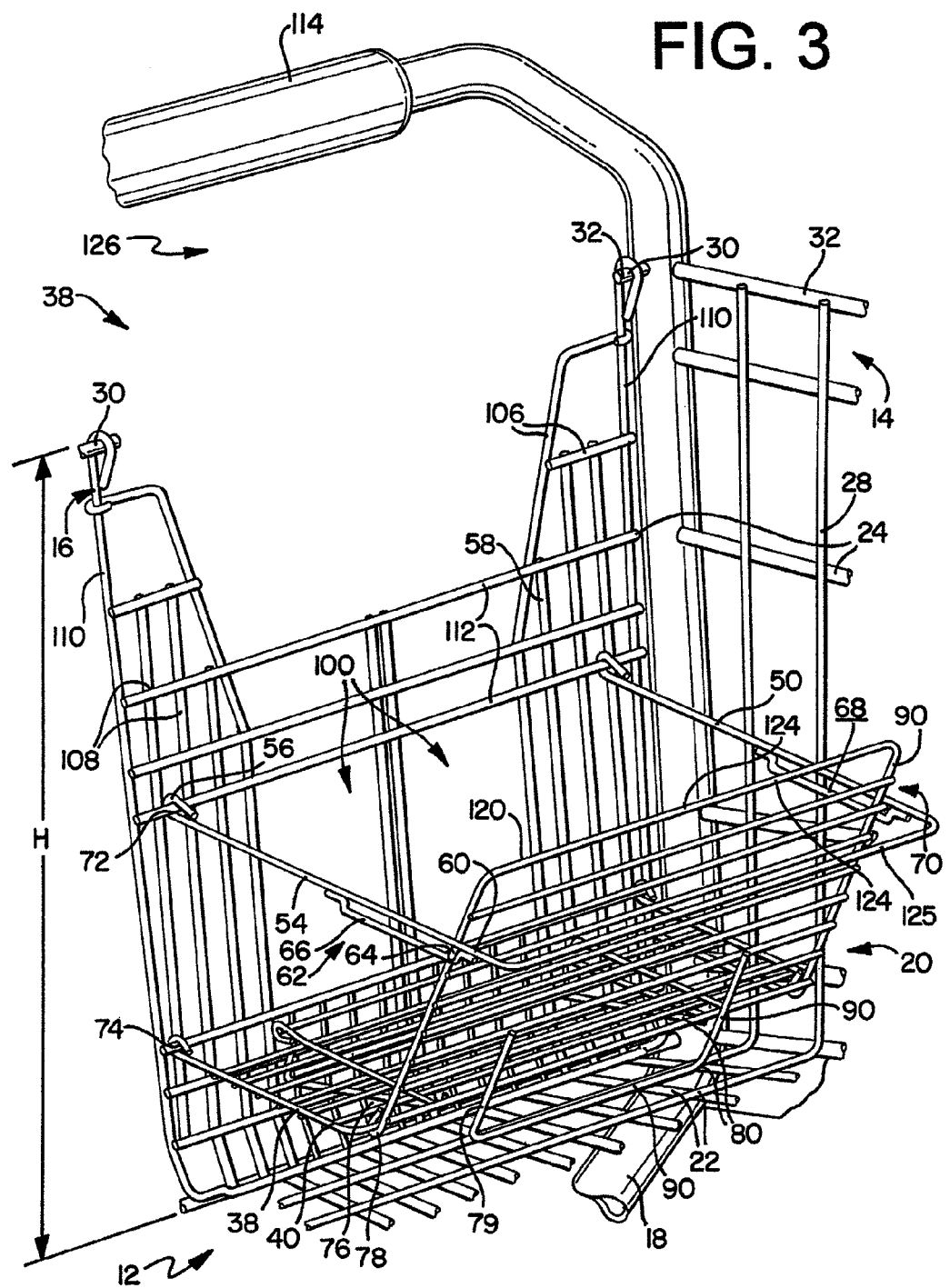
FIG. 3 is a partial sectional view of the assembly shown in FIG. 1, when the child seat assembly is deployed to the use position and thereby has a seat platform that resides generally along a horizontal plane and strut members extending generally horizontally between the rear gate wall and the seat back.
Figure 13:
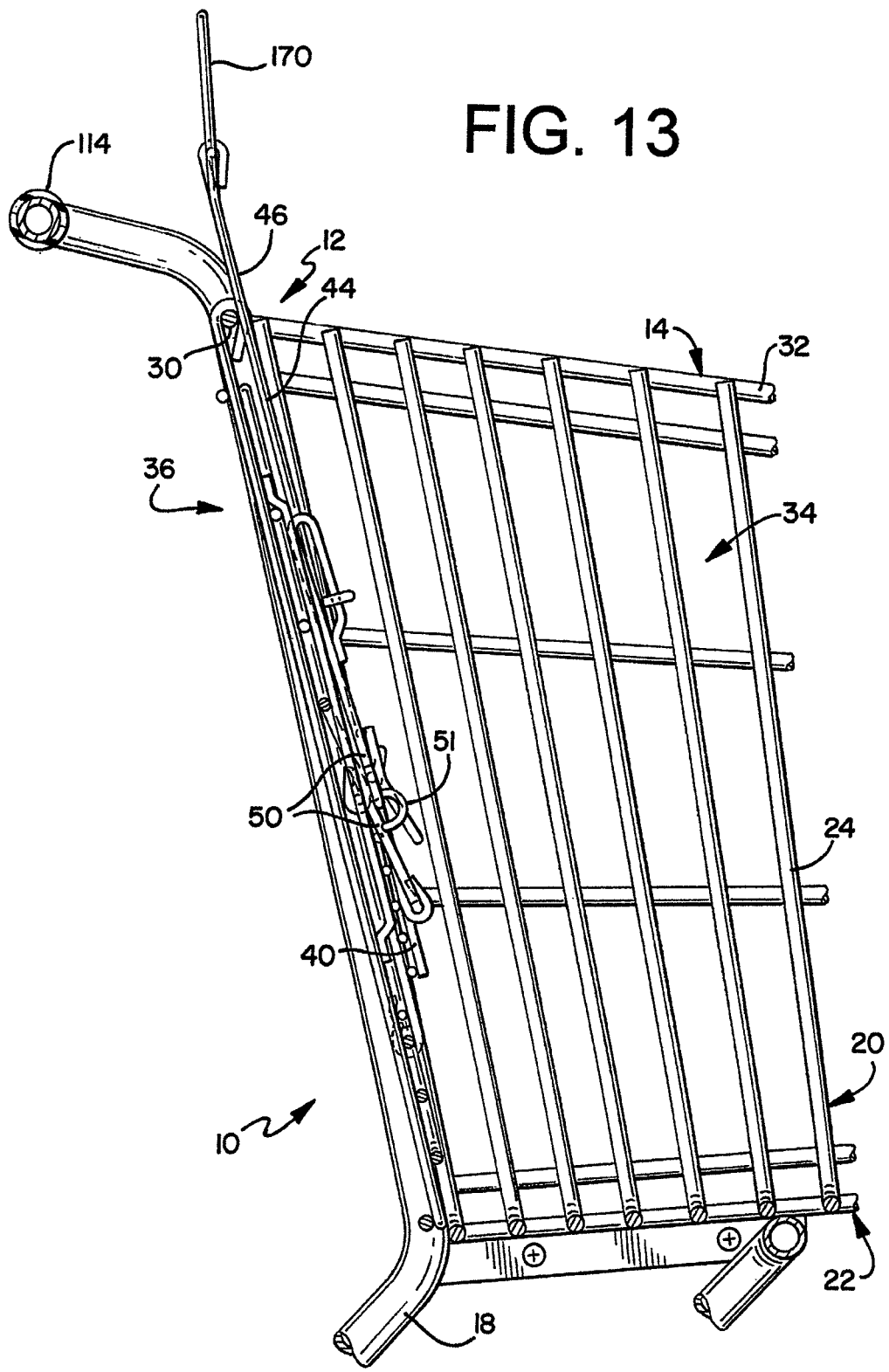
FIG. 13 is a side view of a portion of a shopping cart assembly with an alternate embodiment of the child seat assembly in the collapsed, non-use configuration.
Figure 14:
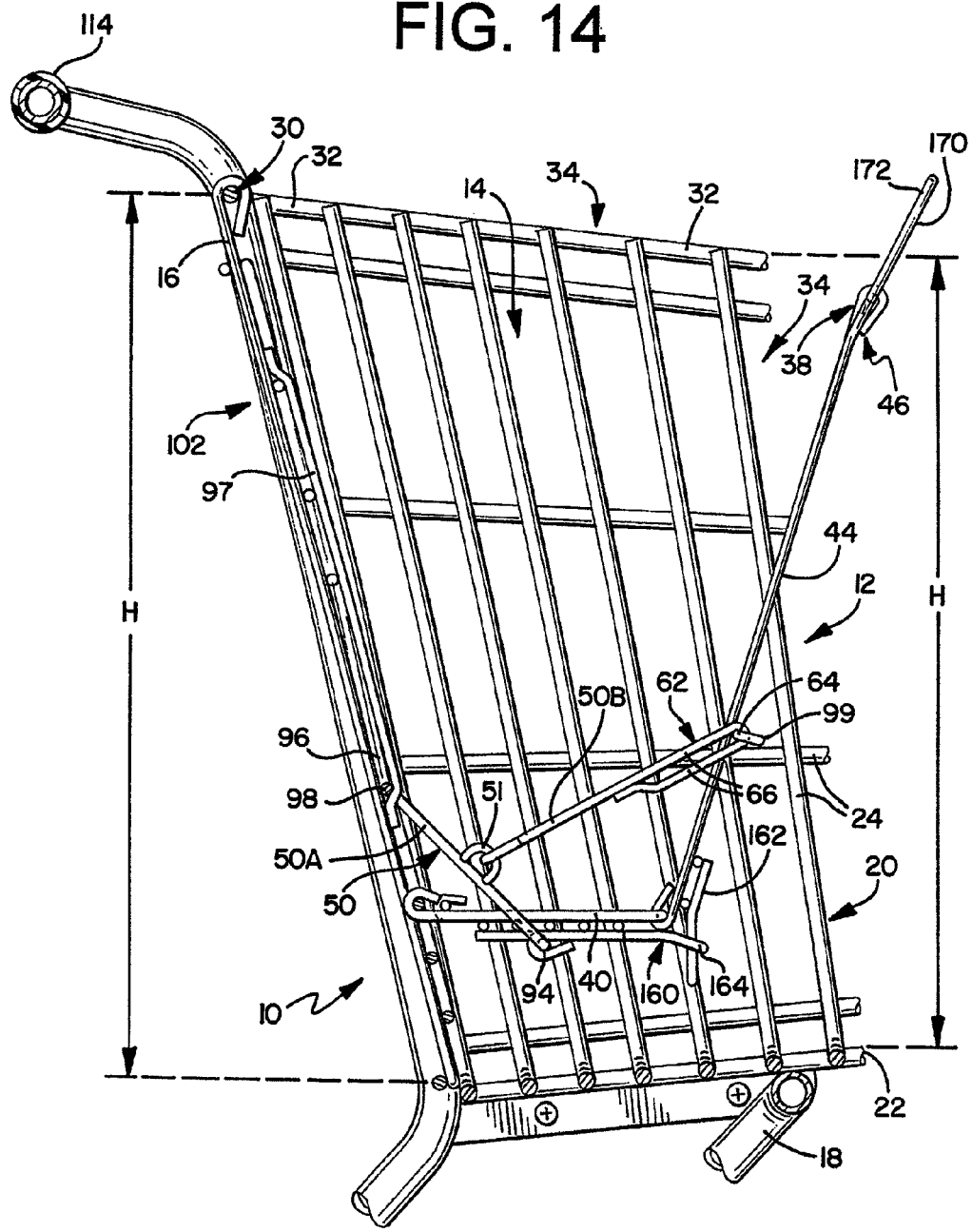
FIG. 14 is a side view of the assembly shown in FIG. 13, with the child seat assembly deployed to the open configuration for use.

Also, in the preferred embodiment of this invention, the child seat 12 is movable between a stowed non-use position 36 (FIGS. 2 and 13) to a use position 38 (FIGS. 3 and 14). When the seat assembly is in the use position 38 and the seat bottom 40 resides along a generally horizontal plane 42, the seat bottom is positioned in the lower portion 20 of the basket chamber 34, preferably at a place below half the height H-H of the basket 14. When placed in such a low position in the basket 14, the cart assembly 10 has a relatively greater stability as compared with conventional designs when a child is placed in the seat assembly 12 and the cart 10 is pushed during shopping. It is preferable that the seat bottom 40 is located below the lower half of the basket chamber 34, to reside in the use position in the lower one-third portion of the chamber 34 at or below one-third of the basket height H-H.

Certain structural details of the present invention provides a child seat 12 that is configured to be moved from the stored configuration 36 to the use configuration 38. Movement between such configurations is achieved by structural details that provides pivotal movement of the seat back 44 relative the rear gate 16 and a sliding movement between the seat back 44 and an auxiliary support arm, shown in the Figures as a pivotable support strut 50 that deploys to an extended position, as shown in FIGS. 3 and 14. Accordingly, when the seat assembly 12 is placed in the use configuration 38, the seat back 44 is hingedly connected to the seat bottom 40, and the upper portion 46 of the seat back 44 is hingedly connected 48 to a generally horizontally extending support strut 50 that passes between the rear gate 16 to the seat back 44. When in the seat back 44 is captured into position deployed in the use configuration 38 by cooperation of the hinged connection 48, the upper portion 46 of the seat back 44 is preferably positioned below the upper third of the height H-H of the basket chamber 34. Further, when the seat assembly 12 is deployed to the use configuration 38, the entire seat bottom 40 and most of the seat back 44 are located within the shopping cart basket chamber 34, and the seat bottom 40 is located in the lower portion 20 of the basket 14 to thereby be surrounded by the sidewall arrangement 24 and have the sidewall extend to a height well above the seat bottom 40. When deployed to the use position 38, the strut member 50 resides in a horizontally-extending space between the rear gate 16 and the seat back 44. In this manner, the support strut 50 has an end secured to the rear gate 16 at a location above the seat bottom 40, and extends to an opposed end that is connected to the seat back 44.

In a preferred form of the invention, the strut member 50 is formed of multiple segments as strut member bodies. In the embodiment shown in FIGS. 13-17, the strut 50 is formed of at least two strut member bodies 50A and 50B, which are joined by an articulating linkage 51, such as the hinge structure formed of inner-locked wire loops, shown in FIGS. 16 and 17. This structure of an articulating strut member 50, formed of hinged strut member bodies 50A, 50B, is preferably combined with a suspension support member 92 which is configured to provide a harness for supporting the seat bottom, in a suspended manner, from at least one of the strut member bodies 50A, 50B.

Figure 17:
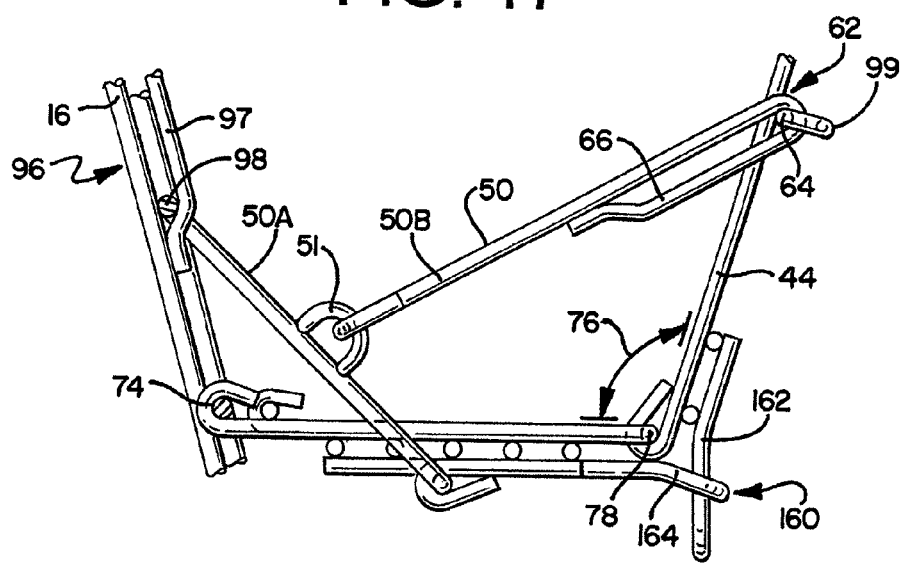
FIG. 17 is a side view of the lower portion of the assembly shown in FIG. 16.
Figure 18:
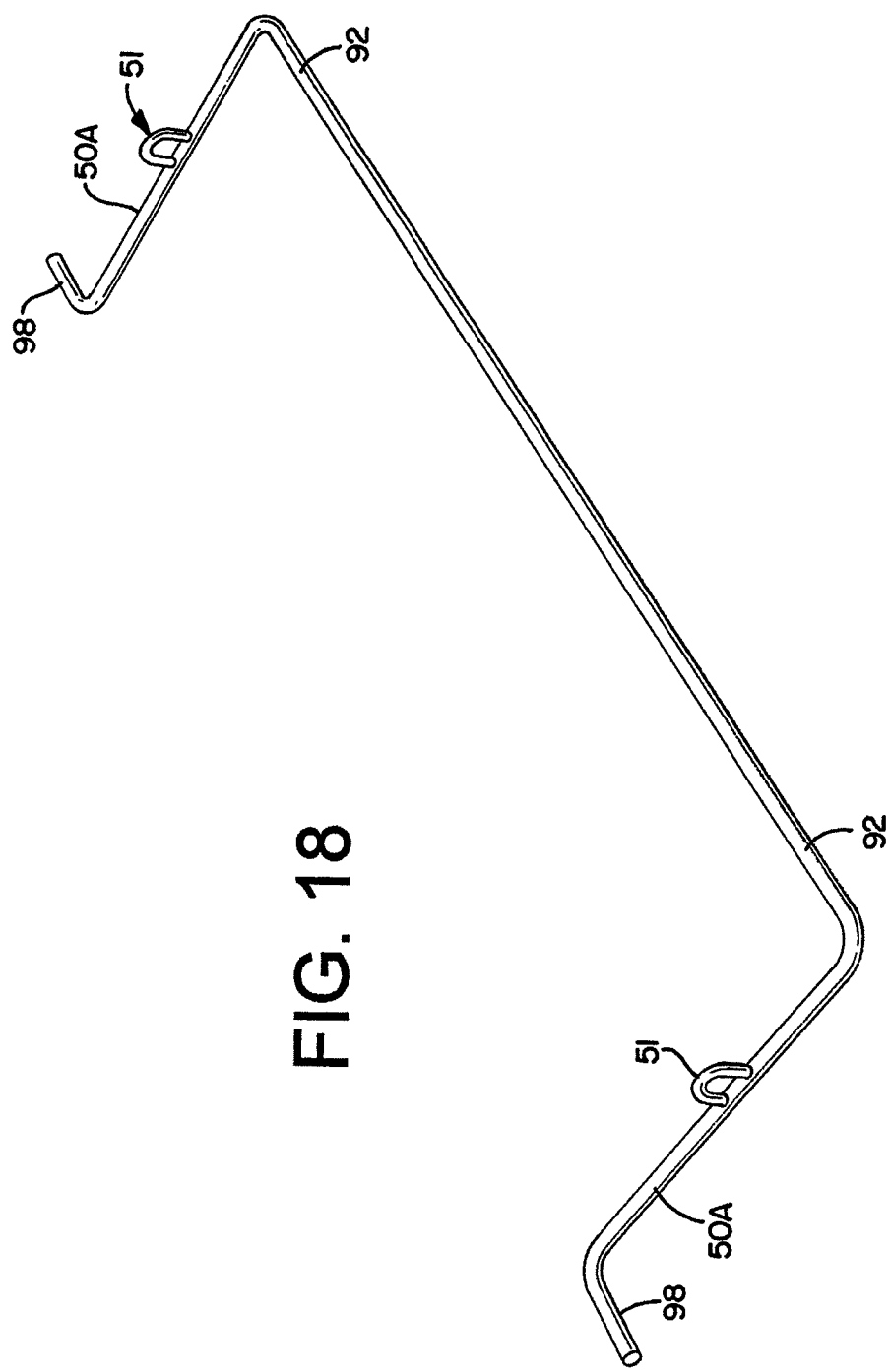
FIG. 18 is an elevated perspective view of a seat bottom suspension support member, shown as a single component of the assembly depicted in FIG. 14.

In a preferred form of this embodiment of the invention, the suspension support member 92 is directly connected to a strut body 50A, as shown in FIG. 18. In this embodiment, the direct connection of the strut body 50A and the support 92 may be formed as a unified structure from a single bent wire rod, as is shown in FIG. 18. Thus, at least one segment of each strut 50A is configured to provide support for the seat bottom 40 by direct connection to the support member 92, which is secured to the underside of the seat bottom 40 by a hinged connection 94. The other strut body 50B of each strut member 50 is preferably connected to the unified support 92 at the articulating linkage 51, shown as mating loops of wire rod (FIG. 17).

In a preferred form of the invention, the seat bottom 40 is located approximately 14 to 18 inches down from the top 32 of the basket walls 24, in the range of two-thirds the distance between the basket top 32 and the basket bottom 22. In this arrangement, the seat assembly 12 is surrounded by sidewalls 24 deep in the basket 14, providing surrounding protection for the child and inability for a child to lean out from the edge of the cart basket 14. This further provides a low center of gravity for the seat assembly 12, such as when a child or an infant carrier 52 (in phantom) is placed in the seat assembly 12. When an infant carrier 52 is placed in the child seat assembly 12 of this invention, the spaced relationship between the rear gate 16 and the seat back 44 provides cooperative support for the carrier 52. In this manner, it is preferable for a portion of the upper portion 46 of the central area rear gate 16 to be located generally at the same height as an opposed portion of the upper portion 46 of the seat back 44 as the assembly 12 is positioned within the basket 14.

Figure 7:
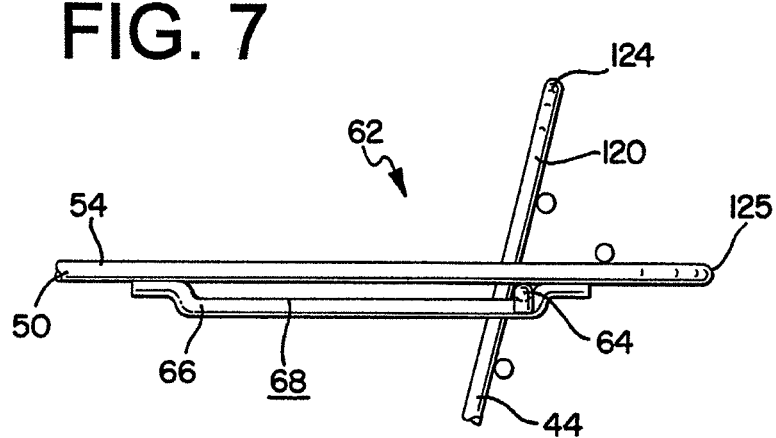
FIG. 7 is a side view of the tracking arrangement between the support strut and the seat back of the seat assembly shown in FIG. 1, wherein the seat is in the use configuration (FIG. 5) and seat back is extended on the track.

The strut member 50 may be formed of elongated wire 54 that is connected to the rear gate 16 with a loop 56 of the wire material 54 that captures a portion of the rear gate lattice 58, with an opposed end 60 of the support strut 50 being connected to the seat back 44. As is shown in detail in FIG. 7, the sliding movement of the seat assembly 12 is preferably constructed from a slide track arrangement 62, including a slide component 64 of the seat back 44 in combination with a track segment 66 of the strut member 50. The slide component 64 of the seat back 44 is cooperatively dimensioned to slide along a guide surface 68 provides an elongated guide surface that slidingly mates with the track portion 66 of the strut member 50. This arrangement for sliding movement of the seat assembly is unlike any mating slide surfaces of conventional devices. This slide track assembly 62 provides a sliding mating surfaces at the location of the hinged connection 70 between the horizontal support strut 50 and the seat back 44. This provides movement of the rotational axis of the hinge 70 connecting between the seat back 44 and the support strut 40. This slide track arrangement 62 is between a slide component 64 of the seat back 44 and the elongated guide surface 68 of the support strut 40, however this arrangement may be altered or even reversed to provide movement of the hinged connection 70. For example, the track arrangement 62 may be achieved by reversing the mating components (64 and 66), with the slide component being located on the support strut 50 and the track surface being located on the seat back 44. Also, the movable hinge line 70 of connection of the strut member 50 of FIGS. 3 and 7 may include additional movable hinge connections, such as the hinged connection 72 of strut member 50 to the rear gate 16, or the hinged connection 74 of the seat bottom 40 to the rear gate 16. This may be done without departing from a significant feature of the present invention—structure providing a seat assembly 12 that deploys between a storage configuration 36 and a use configuration 38, wherein a hinged connection 48 of the seat back has a track arrangement 62 for movement of the hinge axis along the track. This arrangement provides structure wherein the seat back 44 may be deployed to the use configuration 38 and have the seat back 44 reside in a place that is tilted forward of the vertical axis. In other words, the seat back 44 in the use configuration 38 is capable of having an obtuse hinge angle 76 relative the seat back 44. This provides a seat back 44 that is slanted from the vertical plane for comfort and fit when in use with a child in the seat 12. When the seat assembly 12 is thereafter moved to the non-use configuration 36, the track arrangement 62 provides a guide for movement of the hinge line 48 so the seat bottom 40, strut member 50, and seat back 44 are configured to rest flat against the rear gate 16. Without the track guided movement of the hinge axis 48 between the assembly components, the flat non-use arrangement 36 of the assembly would not be available for an assembly in which the seat back 44 rests in a forward position when in use.

Figure 15:
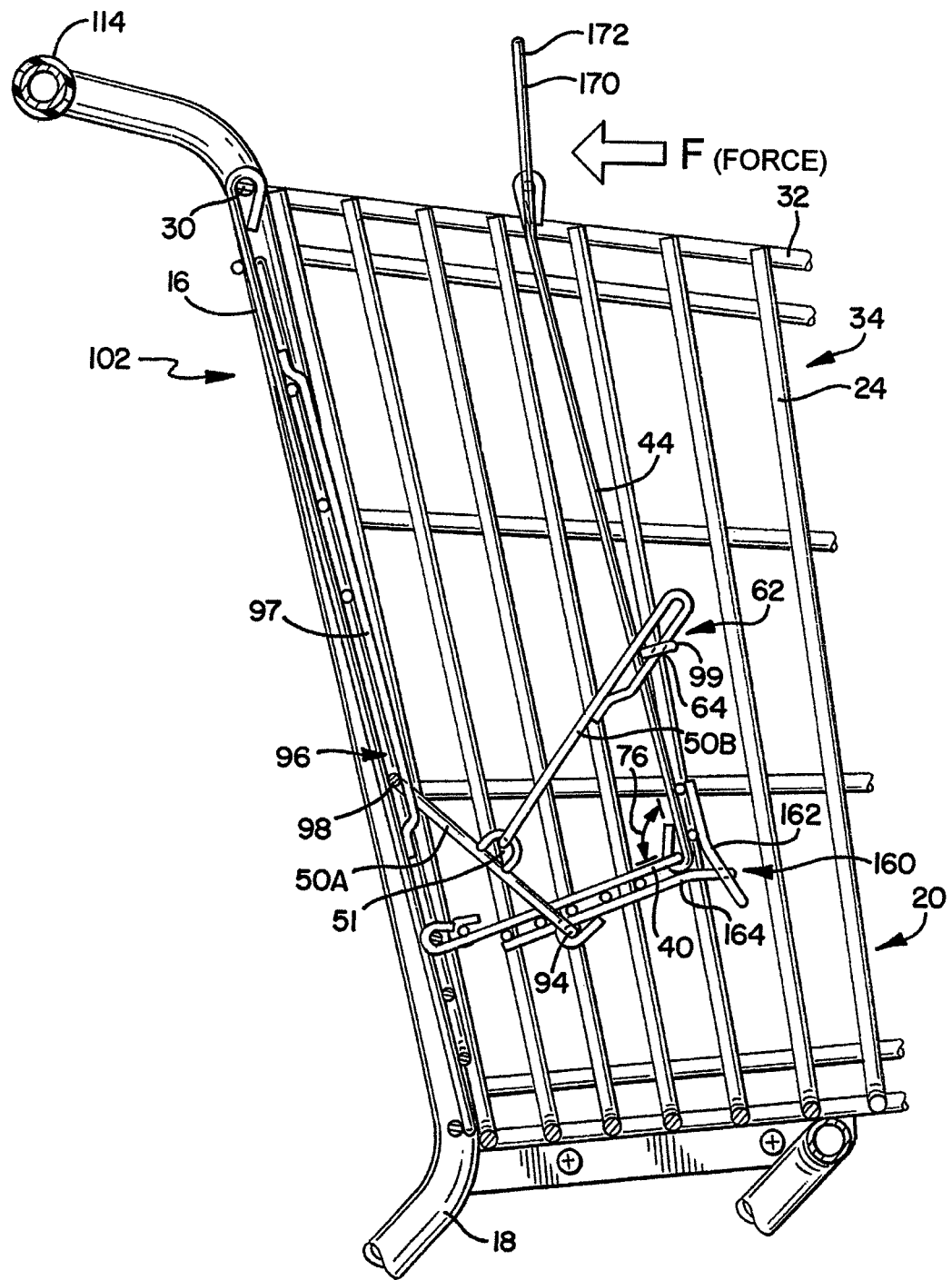
FIG. 15 is a side view of the assembly shown in FIGS. 13 and 14, with the child seat assembly at a mid-placement between the use and non-use configurations.
Figure 16:
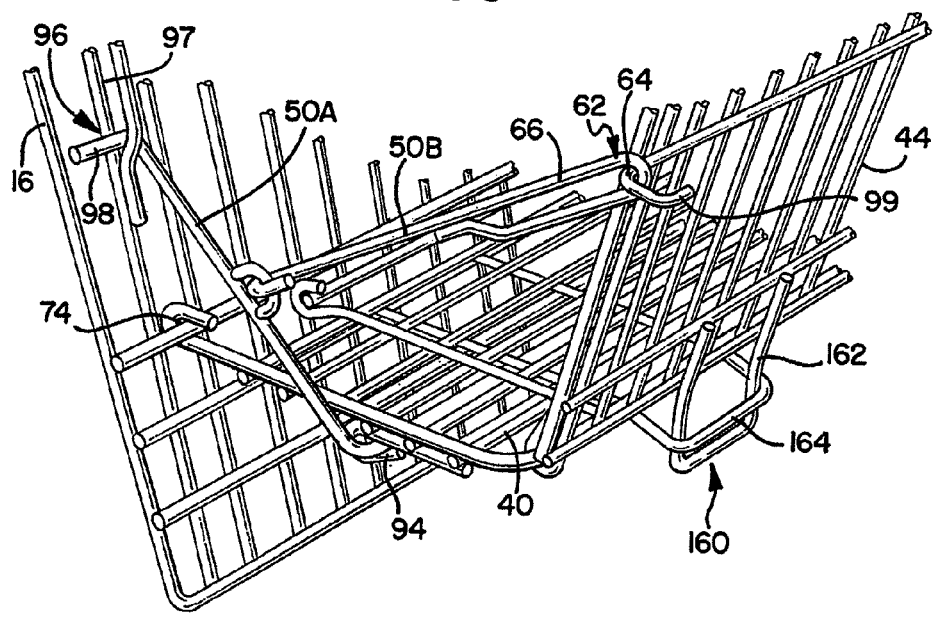
FIG. 16 is a perspective view of a lower portion of the assembly shown in FIG. 14.

An example of such alternative track arrangement and hinged connection is shown in the embodiment of FIGS. 13-19. In this embodiment, the strut member 50 is slidably and hingeably connected to the rear gate 16 by a mating slide track assembly 96, shown as a track 97 integral with the rear gate 16 and a guide 98 protruding from an end of the strut member 50. Also, the strut member 50 is hingeably and slidably connected to the seat back 44 by a second slide track assembly 62, similar to the structure described with reference to FIG. 3. This arrangement of hinged and slidable connection at each end of each articulating strut 52 facilitates movement of the seat back 44 between the use configuration shown in FIG. 14 and the storage, or non-use, configuration of FIG. 13. As is shown in FIG. 15, the assembly 12 is configured to provide slidable hinged connection arrangement 62, 94 of the strut members 50A, 50B as the seat assembly 12 is opened and closed. A stop brace 99 is preferably positioned adjacent the slide track arrangement 62 between the seat back 44 and the second strut member 50A. The stop brace 99 is positioned to engage with a portion of the strut member 50B to facilitate closing of the assembly 12, when a force (F) is applied against the uppermost region of the seat back 44. In this manner, the stop brace 99 is configured to engage with the strut member 50B when the shopping cart assembly 10 is stacked together with a like cart assembly. The stop brace 99 is thereby configured to engage with the strut 50 to transfer the load of force (F) acting upon the seat back 44.

In the embodiment shown in FIGS. 13-19B, the seat bottom 40 and seat back 44 preferably include at least one interlocking assembly 160 which also is configured to transfer the load of a force (F) applied against the uppermost portion of the seat back 44 due to engagement with the upper portion of a like cart when stacked together. The interlocking assembly 160, shown in FIGS. 13-17, has a first member 162 integral with the seat back 44 and a second member 164 integral with the seat bottom 40. In the preferred embodiment, this assembly 160 is formed of wire rod such that the first member 162 extends from the seat back 44 as a U-shaped body, and the second member 164 extends from the seat bottom 40 as a U-shaped body that is configured to receive at least a portion of the first member 162. In this embodiment, the interlocking assembly 160 is configured as a mating arrangement of a projection 162 and a receiver 164. Of course, the position of the projection 162 and receiver 164 may be reversed, such that the projection may be integral with the seat bottom 40 and the receiver may be integral with the seat back 44. Further, this interlocking assembly 160 may be configured as a projection and mating receiver with either or both incorporated as part of the seat back 44 or seat bottom 40, rather than integrally-connected projecting bodies. Such variations do not depart from the present invention of providing an interlocking assembly 160 between the back 42 and bottom 40 results in widening the angle 76 as the seat back 44 is forced toward the rear gate 16. This arrangement is thus configured to urge the assembly 12 toward the rear gate 16 as the force (F) moves the assembly 12 to the non-use configuration 36, shown in FIG. 13. As the assembly 12 is collapsed against the rear gate 16 (FIG. 13), the projection 162 passes further into the receiver 164 until the assembly 12 is extended flat against the gate 16.

Figure 4:
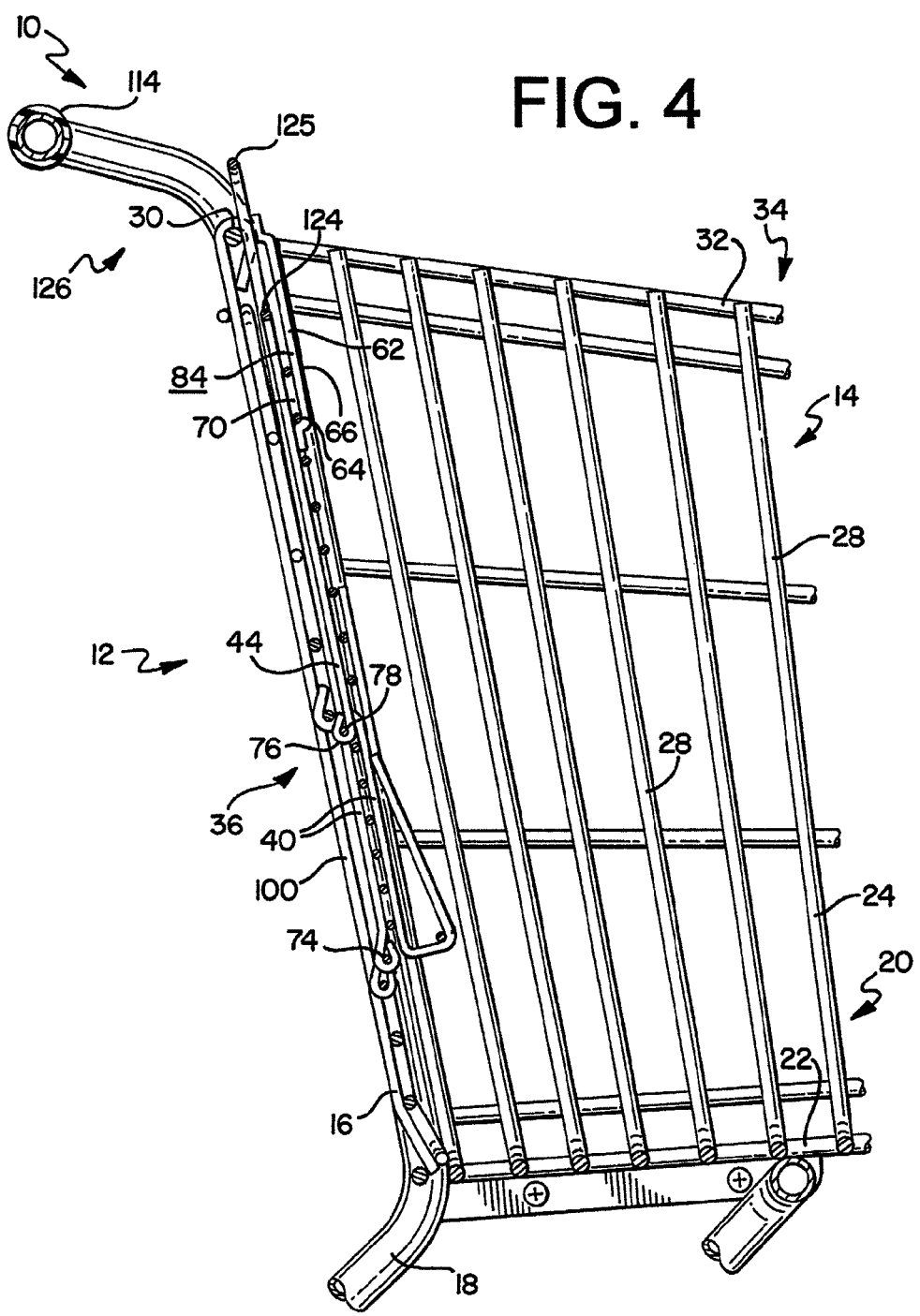
FIG. 4 a sectional view of the assembly shown in FIG. 2, viewed along sectional line 4-4.
Figure 9:
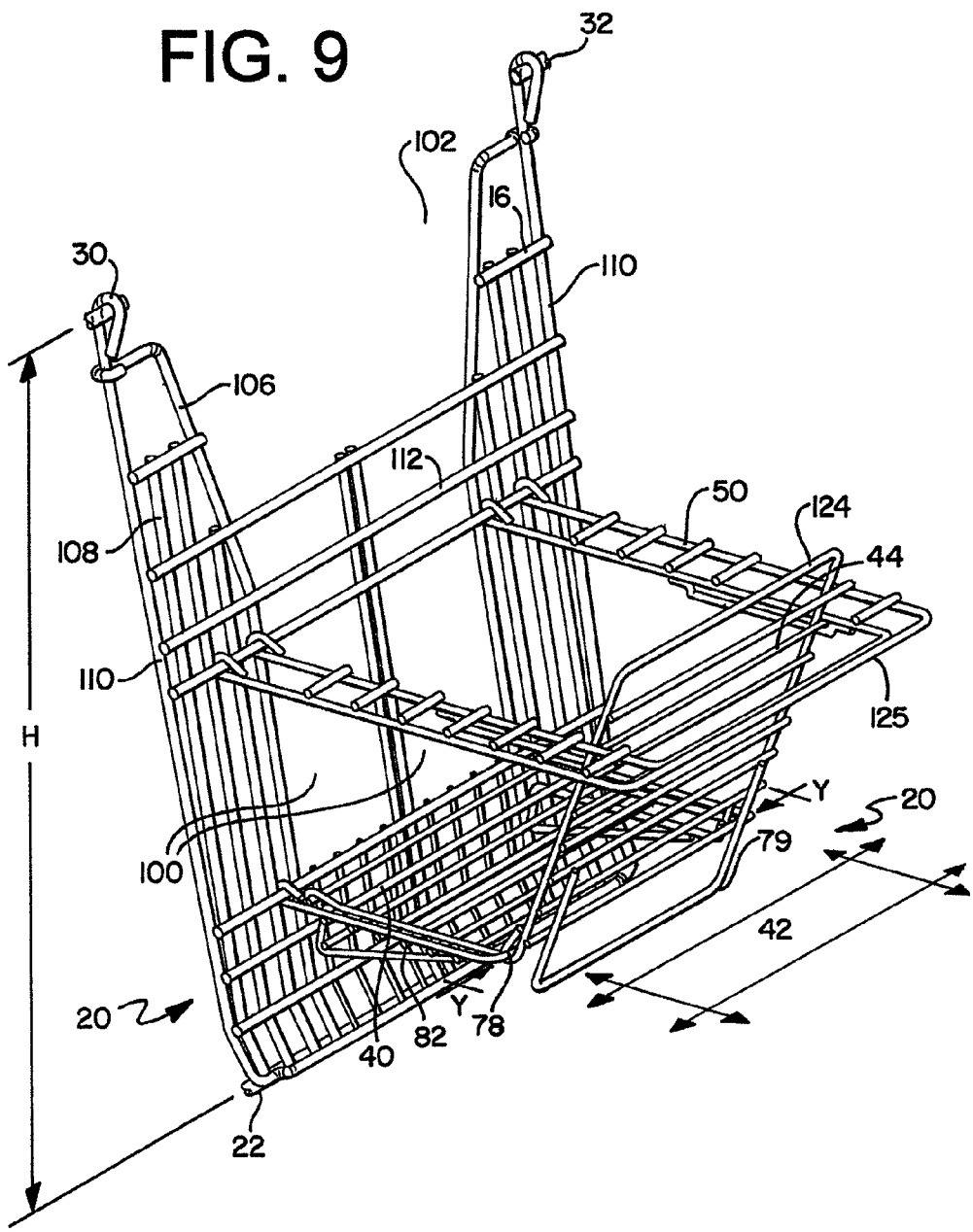
FIG. 9 is an alternative embodiment of the child seat assembly configured for attachment to a rear gate such as shown in FIGS. 1 and 3, with widened strut members to provide arm rests and the seat assembly being in the use position.
Figure 10:
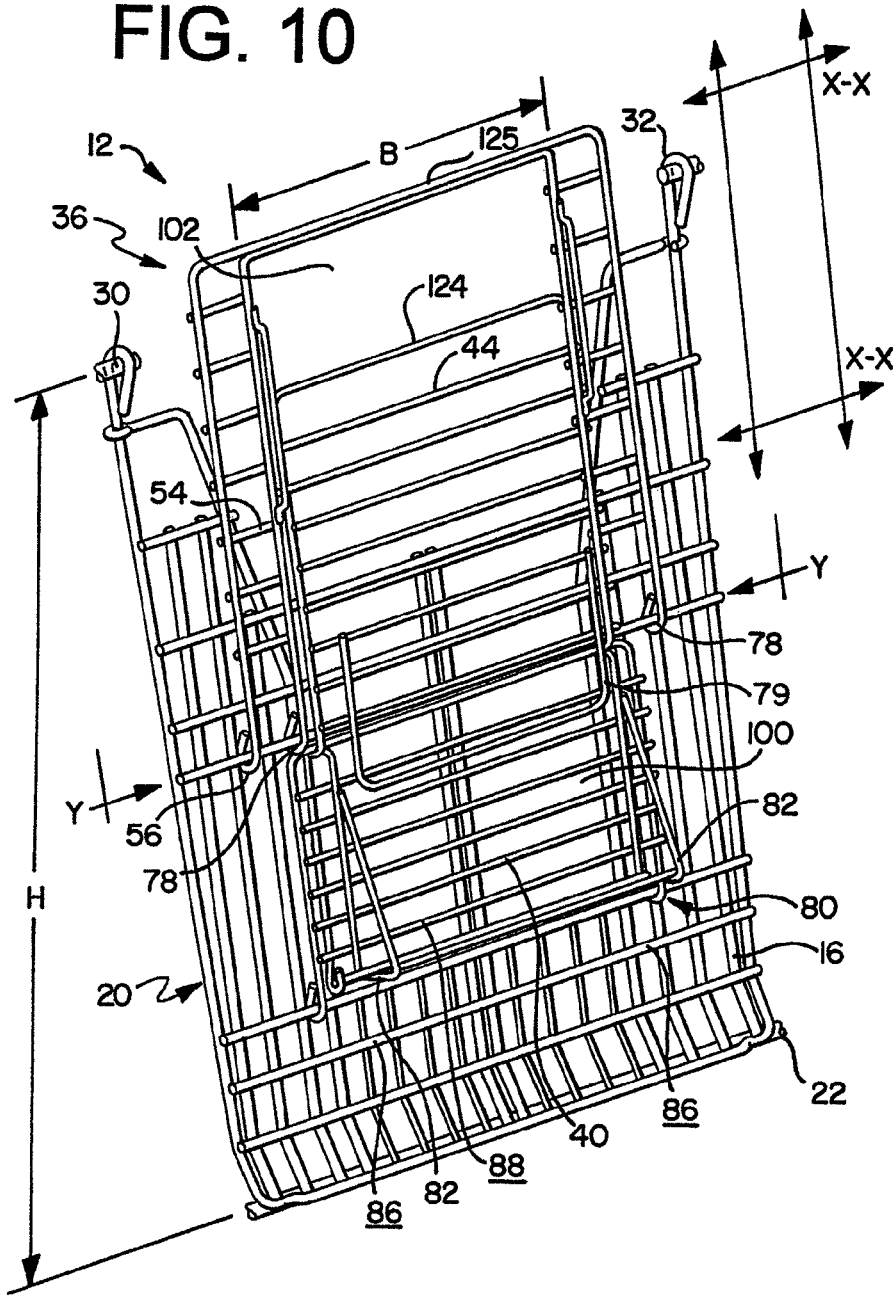
FIG. 10 is a view of the assembly of FIG. 9, with the seat assembly being moved to the non-use position.

When the seat assembly 12 is placed in the storage position 36, i.e., placed in a first position in which the seat back and bottom are collapsed and nest against the rear gate for storage and for lifting of the gate as shown in FIGS. 2 and 4, at least a major extent of the seat back 44, seat bottom 40 and support strut 50 preferably reside together along a common plane X-X. Alternatively, these components of the assembly 12 rest stacked together substantially flat against the rear gate 16 for storage in the non-use configuration 36. Unlike conventional shopping cart child seat devices, the seat back 44 and bottom 40 are in hinged connection 78 along a hinge axis Y-Y (FIGS. 9 and 10), whereby the hinge angle 76 between the back and bottom is opened to 180 degrees when the seat is stored 36 flat along the gate 16 (FIGS. 4, 10). This unique arrangement of the seat assembly 12 in the storage configuration 36 is achieved by the structure of the invention that permits movement of the seat 12 in-and-out of deployment, whereby the seat is not connected to any extension of the assembly to the bottom portion of the rear gate, such as the structure found in prior art type of devices. Rather, it is supported by the combination of the horizontally extending strut 50 and a lower support assembly 80.

In the preferred embodiment, shown in FIGS. 1-12, a stop or blocking component is provided to prevent the hinged connection 78 between the seat back 44 and bottom 40 from inverting, preventing the hinge angle 76 from extending greater than 180°. In the embodiment shown in the Figures, the blocking component includes a tail portion 79 extending from the seat back 44, which makes contact with a portion of the underside of the seat bottom 40 when the assembly is collapsed to the non-use configuration, such as is shown in FIG. 10. This structure thereby provides a means for preventing inversion of the seat back/bottom hinged connection 78.

An alternate but very similar structure for such a means of preventing inversion of the seat back/bottom hinge 78, include other places for positioning the blocking member. For example, a blocking member may extend from the seat bottom 40 to make contact with the back side of the seat back 44. Alternatively, the blocking component to prevent hinge 78 inversion may be secured immediately adjacent the hinge 78, to restrict over-extension of the hinge angle 76.

When the seat assembly 12 is moved by deployment into the use configuration 38 (FIGS. 3, 5, and 9), the hinge angle 76 of hinged connection 78 between the seat back 44 and bottom 40 is reduced, and the seat bottom 40 is moved into position in the lower region 20 inside the basket chamber 34. In this aspect of the present invention, when the seat assembly 12 is moved from the use position 38 into the stored configuration 36, the hinge angle 76 between the back 44 and bottom 40 is opened, increasing the angle 76 of the hinged connection 78 between the seat bottom 40 and the seat back 44. By this movement, the assembly 12 is placed in tandem with the rear gate 16, whereby the seat bottom 40 is located below the seat-back hinge axis Y-Y, and the seat back 44 is raised above the hinge axis Y-Y of the seat-back hinged connection 78, thereby also being positioned in tandem with the rear gate 16. Accordingly, when the seat assembly is in the final movement into the storage configuration 36, the seat back 44 and bottom 40 generally reside along a common plane X-X which lies adjacent the rear gate 16 and rests against the gate 16 for free movement of the rear gate 16 upward for stacking like carts.

In a preferred form of the present invention, shown in FIGS. 1-12, the seat assembly 12 deployed to the use configuration 38 is supported without need for a support member extending to the gate bottom, such connection by a support member that pivots from the bottom of the gate such as is found in conventional devices. Instead, the present invention has cooperative support structure provided by the upper strut 50 and a lower support assembly 80 with a lower body 82 protruding from the seat bottom 40 that is mounted to, or otherwise integral with, the seat assembly 12. The lower body member 82 has an engagement surface 84 that is configured to mate with and engage against a cooperatively positioned mating surface 86 of the cart basket 14. The lower body member 82 preferably extends from the bottom surface 88 of the seat bottom 40, and thereby moves with the seat assembly 12 when deployed between the use 38 and storage 36 positions. When the seat 12 is deployed to the use position 38, the support strut 50 extends along a substantially horizontal plane, and the lower body member 82 extends from the seat bottom 40 toward the basket sidewall 28 or bottom 22 to bring the engagement surface 84 into contact with the mating surface 86 of the basket 14.

Figure 5:
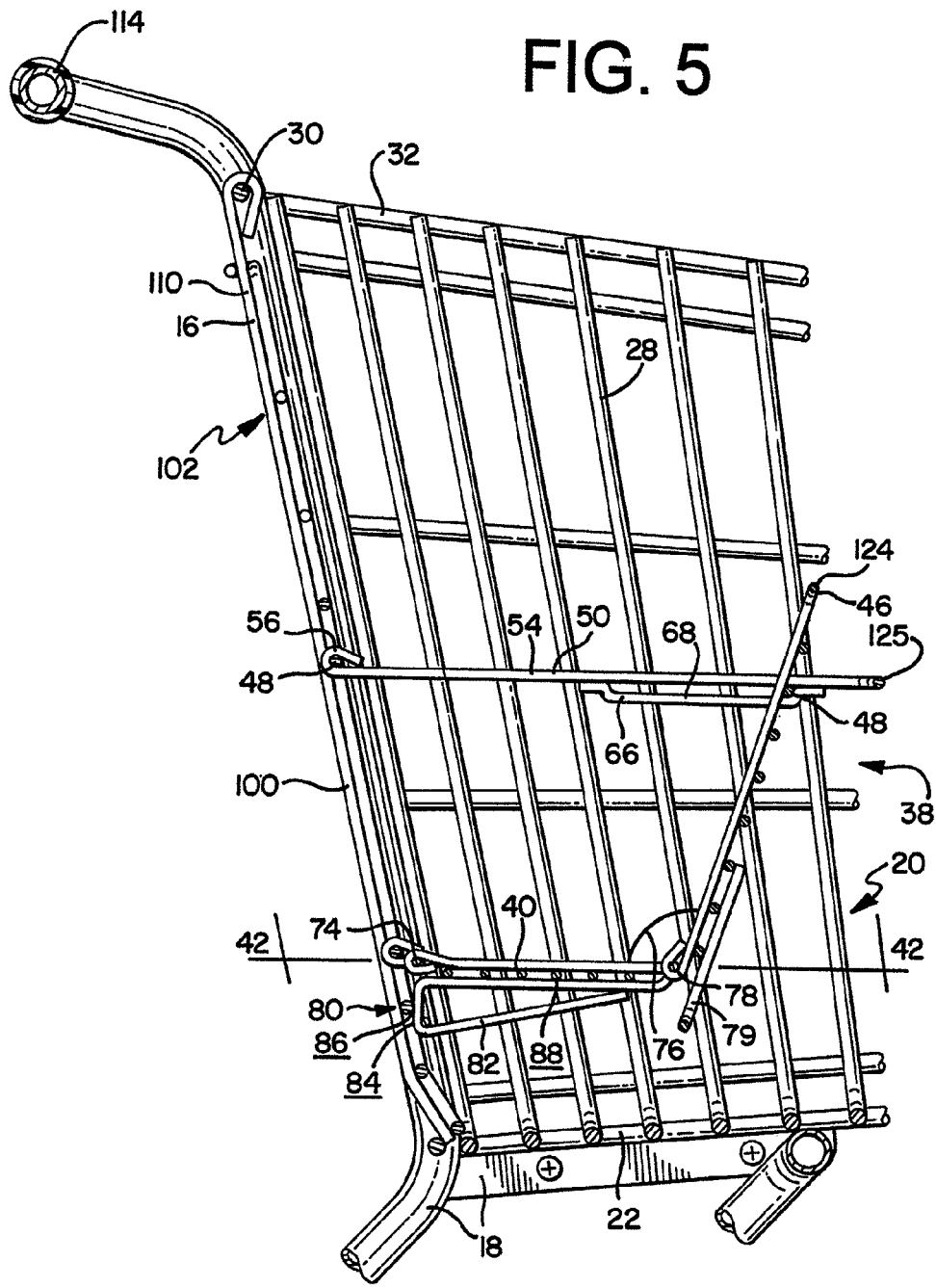
FIG. 5 is a sectional view of the assembly shown in FIG. 3 with the assembly deployed to the use position, viewed along sectional line 5-5.
Figure 8:
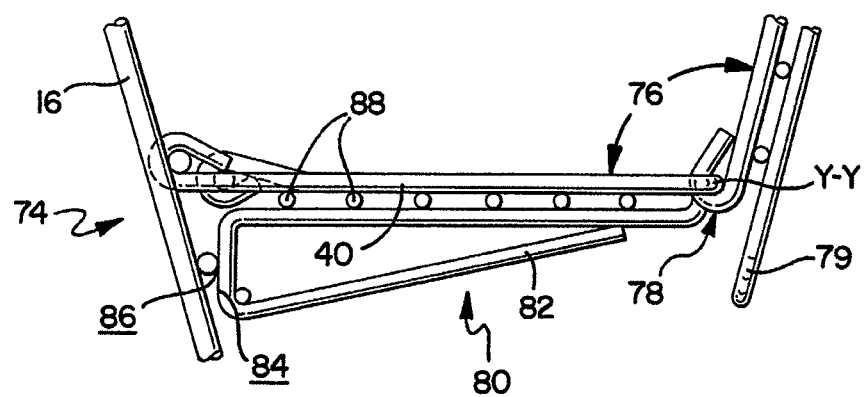
FIG. 8 is a side view of the seat and lower support of the assembly shown in FIG. 1, with the seat assembly in the use configuration and the lower support engaged in cantilevered support against the rear gate of the shopping cart.

The support (engagement) 84 surface of the seat assembly 12 depends from the seat bottom 40 in a direction toward the rear gate 16, such as is shown in detail in FIGS. 5 and 8. As shown in the Figures, this depending structure 82 provides cantilevered support. The engagement surface 84 extends from the seat assembly in a direction transverse to the plane of the seat bottom 40, to mate against the rear gate 16 as a surface 86 substantially parallel an extent of the rear gate 16. In the preferred form of this embodiment, the lower body member 82 includes a portion formed as an angle bracket secured to the seat bottom 40 to provide the cantilevered support. Further, this embodiment preferably utilizes an arrangement of at least two such angle brackets to provide more than one location of cantilevered support under the seat bottom 40. In this embodiment, the support surface 84 includes more than a single continuous surface that engages with the basket rear gate 16, and instead comprises a plurality of surfaces 84 that in combination provide support against the rear gate, such as having one supporting body member positioned adjacent each side of the seat bottom 40.

In the embodiment of FIGS. 1-12, the support surface 84 of the lower body member 82 is configured to engage the bottom wall 22 of the basket 14. In this embodiment, shown in FIG. 12, the depending body structure 82' has an engagement surface 84' that extends generally parallel a major extent of the planar surface of the seat bottom 40. The lower support body 82' has an extent that extends from the seat bottom 40 toward the basket bottom wall 220 when the seat bottom 40 is in the use position 38. The engagement surface 84' is thereby configured to engage with the mating surface of the basket bottom 220. When the seat assembly 12 is moved into the storage (non-use) configuration 36, the seat bottom 40 is moved to reside in a generally vertical plane adjacent the rear gate 16, and the support body 82' thereby extends into the basket chamber 34 from the underside of the seat bottom 40. In this embodiment, the assembly preferably includes at least two such support bodies 82, and preferably includes at least one such body member located at each side of the seat bottom 40.

An alternate embodiment of this type of supporting assembly 80 may be provided as an extension 90 of the seat back 44, to extend below the seat bottom 40 when the seat is in the use position 38. This may done by adapting the tail portion 79 of the seat back 44 to engage a portion of the basket bottom 22 when the seat is deployed for use 38 (see FIG. 3). This embodiment also has the benefit of providing a lower support body like that discussed above 82' that protrudes downward from the seat bottom 40 when the seat is deployed (as in FIG. 3), and yet is configured to rest flat against the rear gate 16 when the seat is in the storage configuration 36 (such as is shown in FIG. 2). Of course, it is also possible, and potentially advantageous, for the seat assembly 12 to provide a combination of the two alternative depending body members, providing cantilevered support against the rear gate 16 and support against the basket bottom 22.

The rear gate 16 is preferably constructed of a lattice 58 of material such as is typical of conventional cart structures. This lattice structure 58 may be formed of plastic, or formed of metal wire or rod. The lattice structure 58 of the rear gate 16 has at least one leg opening 100 that is positioned in the lower region 20 of the basket chamber 34, located in an area immediately above the position of the seat bottom 40 in the use configuration 38. The leg opening or openings 100 thereby consist of a lower void area of the lattice structure 58, located in a position to accommodate the legs of a child when placed in the seat 12 deployed into the lower portion 20 of the cart basket 14.

In a preferred form of the present invention, the rear gate 16 has an upper void region 102 located above the leg opening(s) 100, providing an open area that extends up to the area of the gate hinge 30. This void region 102 provides an open area of the gate, preferably as an opening in the rear gate lattice material 58, below the upper portion 46 of the seat back 44 when the seat is deployed 38. This provides an opening 102 in the area of the upper body of a child placed in the child seat 12. Preferably, the void region 102 of the gate is below the handle 104 of the cart 10, and has a width sufficient for providing space for the child's head and upper torso, whereby the child is otherwise surrounded by the cart basket arrangement 24 and the seat back 44. Also, in the preferred embodiment, the void region 102 has no crossbar of the cart, such as the conventional cart structure at the rear gate hinge. Alternatively, at least a partial cross-member, such as the extent of the hinge 30 at the top of the basket 14, may extend partially into the void region 102. This structure is configured to provide a suitable void region 102, and yet also provide a supporting structure for the collapsed structure of the seat assembly 12 when in the non-use configuration, to prevent the top 170 of the assembly 12 from being inserted under the handle 114 when the rear gate is pivoted upward.

The void region 102 of the rear gate 16 has a width of an opening that is less than the full width of the lattice material 58 of the rear gate 16, such that the seat back 44 substantially covers the upper opening 102 when the seat assembly in the non-use (storage) configuration 36 against the rear gate. In the embodiment shown in the Figures (see FIGS. 3 and 19), this arrangement of an upper opening 102 is formed by having upper connection members 106 extend from the rear gate hinge 30 are toward the full lattice body portion 108 of the rear gate 16 located below the upper void region 102. In the preferred embodiment, the top of the central region 112 of the rear gate 16 is at a height compatible with the height of the upper portion 46 of the seat back 44. This provides cooperative support between the rear gate 16 and the seat back 44 for supporting an infant carrier 52. Thus, the void region 102 has a configuration for permitting the width of an infant carrier 52 to be placed in the basket 34 and rest on the assembly 12. In the embodiment shown in FIGS. 3 and 19, the upper connection members 106 consist of elongated portions of the lattice material 58, such as the wire forming the rear gate 16. The upper connection members 106 extend from the top of the rear gate 16 at the hinge area 30, with some of the wire connection members 106 extending at an angle from the side 110 of the gate 16 to the central region 112 of the rear gate 16. This arrangement of angled connection results in a structure in which the upper opening 102 that is wider at the top and gradually angles inward for the lattice 58 to fill the intermediate region 112 of the rear gate 16 located above the leg opening(s) 100.

The handle 114 of the cart 10 may be elevated relative to conventional cart devices, to a greater height above the top 32 of the basket 16, and may be lowered relative to that which is depicted in the Figures. If the handle were raised, a lesser amount of void region 102 than shown in the Figures may be suitable for providing space for the upper body of the child, without departing from the structure of the present invention. Nevertheless, this aspect of the present invention is practiced by providing the structure of a void region 102 of the rear gate 16, in which an extent of the rear gate 16 lattice 58 has a height less than that of the basket chamber 34, i.e., below the height of the basket top 32. In order to provide a cart assembly 10 suitable for use when the seat assembly 12 is in the non-use position 36, and avoid potential for items in the basket 14 to fall through an opening (100 and 102) in the rear wall of the cart, the seat assembly is configured to collapse against the rear wall (the rear gate) to substantially cover both the upper opening 100 and the leg opening(s) 102. In the embodiment shown in the Figures, the seat bottom 40 moves against the rear gate 16 to cover a major extent of the leg opening(s) 100, and the seat back 44 moves against the rear gate 16 to cover at least a major portion of the upper opening 102.

In this embodiment, an upper extended member 120 connected to the seat back 44, such as an attached elongated wire 122 passing across the width B-B of the seat back 44, protrudes above the seat back 44 when the seat is in the storage position 36. The upper extended member 120 provides a gripping portion 124 for the user to utilize for moving the seat 12 from the use position 38. In the embodiment shown in FIGS. 1-12, a second gripping bar 125 extends from the strut members 50, as an extended portion from at least one strut member 50 located forward of the seat back 44. When in the non-use position 36, the second gripping bar 125 is located in an area above the top 32 of the rear gate 16 and below the height of the cart handle 114. When the rear gate 16 is lifted during cart stacking by rotating the rear gate 16 about the gate hinge 30, the second gripping bar 125 of the seat assembly 12 rotates with the rear gate 16 and passes through the open region 126 between the cart handle 114 and the rear gate hinge 30. Thus, the upper extended portion 120 of the seat back 44 and the gripping bar 125 of the strut member(s) 50 provide handles 114 for deploying the seat 12 between use 38 and non-use 36 positions, without obstruction of movement of the rear gate 16 when nesting carts together.

In the embodiment shown in FIGS. 13-22, a structure is provided to facilitate deployment of the seat assembly 12 to the use configuration, and to automatically move the assembly 12 to the non-use configuration when stacking carts 10 together, as one cart 10 is inserted into another like cart. Although conventional shopping carts provide for such structural movement of the seat assembly, the present invention, whereby the seat bottom 40 is positioned in the lower portion 20 of the cart chamber 34, requires unique engagement of components. This is provided in the embodiment shown in FIGS. 13-22, whereby at least one extending body 170 of the seat back 44 protrudes above the top 32 of the basket sidewall arrangement 24 when the assembly 12 is in the use configuration. The at least one extending body 170 is preferably an integral part of the upper portion of the seat back 44, such as shown in FIGS. 19-21. The extending body 170 may be made up of two spaced protrusions 172 of the seat back 44, extending beyond the top 46 of the seat back 44 and the adjacent upper edge 32 of the basket 14 when the assembly is in the use configuration, as shown in FIGS. 14 and 21. This configuration of the spaced protrusions 172 is configured to contact the upper portion of a similar cart when stacked together, and to thereby receive a force (F) moving the upper portion 46 of the seat back 44.

Unlike traditional cart structures, the present invention provides structural features configured to transfer the load of this force, making it possible to have a seat bottom 40 located in the lower portion 20 of the basket 14, and yet also automatically close when stacking carts together. As is described herein, the interlocking assembly 160 and the articulating strut components 50A, 50B are configured to transfer the load of force against the seat back 44, to pivot the seat bottom 40 towards a closed position as in the non-use configuration.

Another possible configuration of an extending body 170 is shown in FIG. 20, in which a central extended region 174 of the seat back 44 extends above the top 46 of the back 44 and above the top 20 of the basket 14. This structure of the body 170 provides a central region 174 as a headrest for a child positioned in the seat assembly 12.

Figure 11:
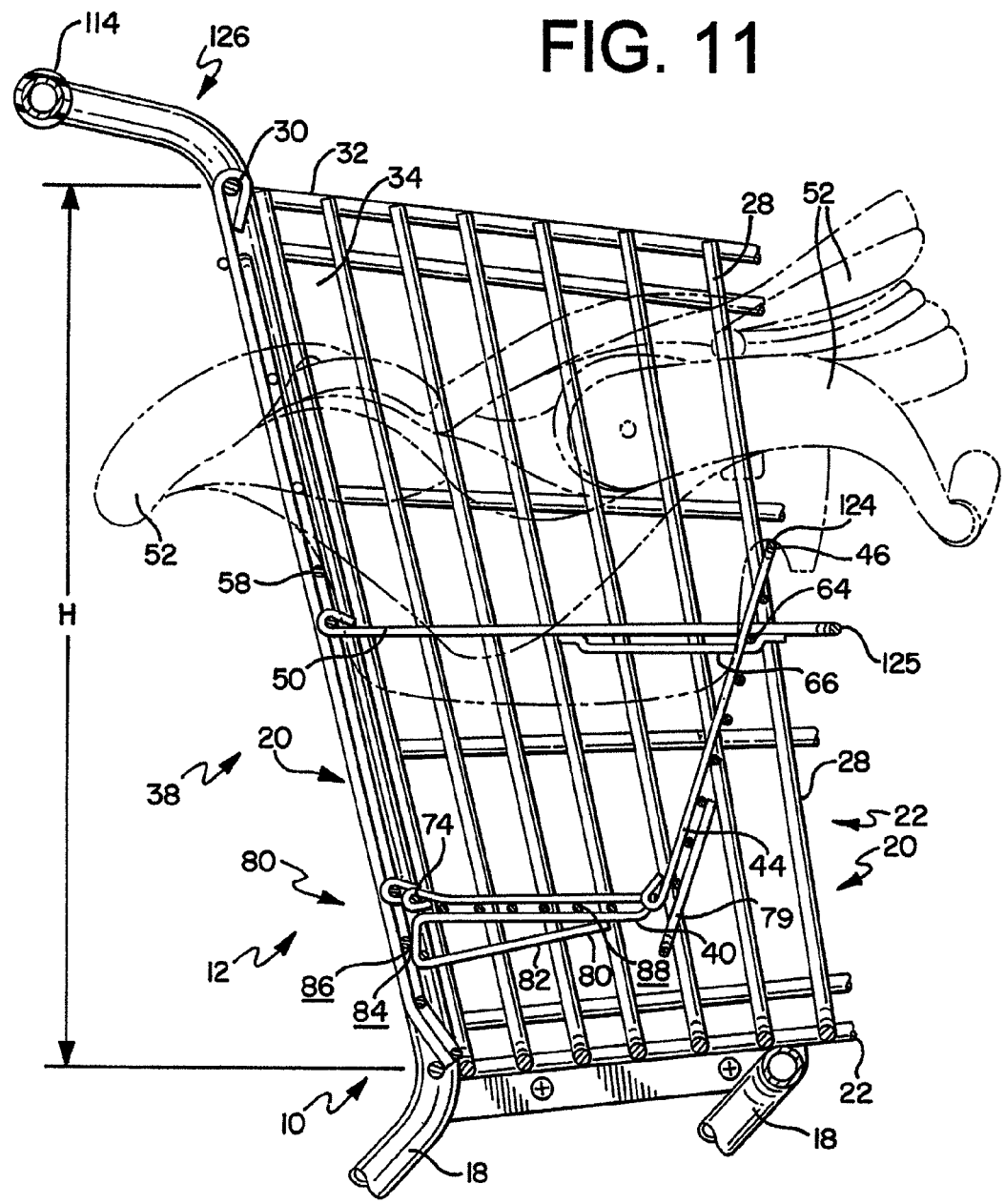
FIG. 11 is a side view as in FIG. 5, with the addition of a popular infant carrier in position within the seat assembly shown in dashed lines.
Figure 12:
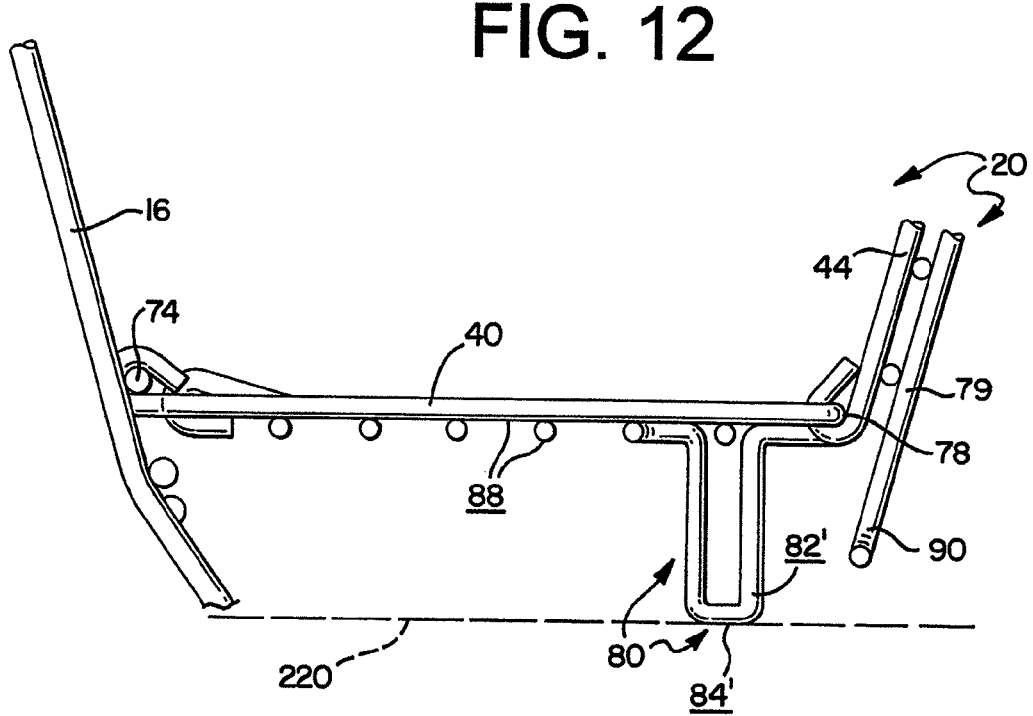
FIG. 12 is a side view of an alternative embodiment to the device shown in FIG. 8, with the lower support being positioned to engage the bottom wall of the cart basket to support the seat assembly in the use position.
Figure 19A:
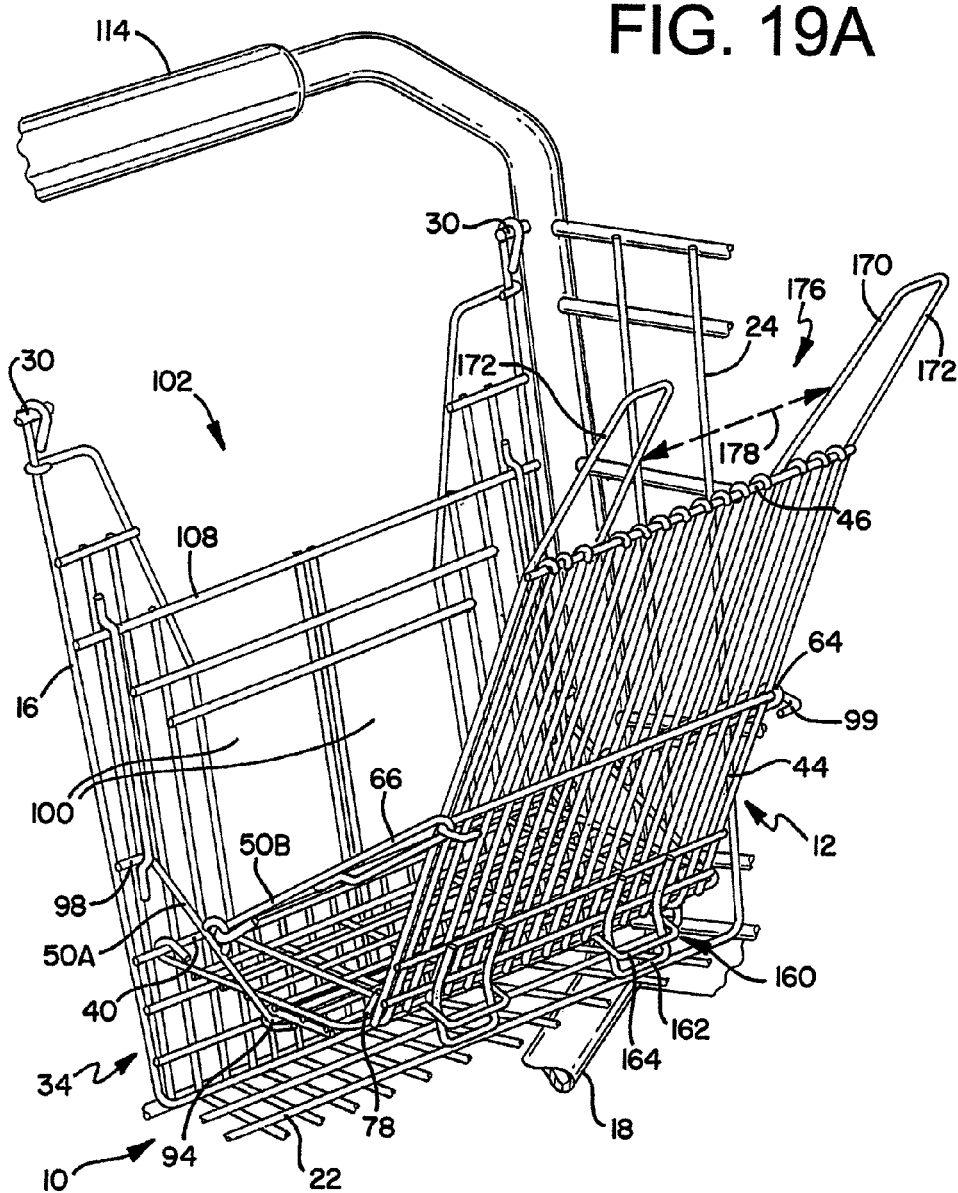
FIG. 19A is an elevated perspective view of the assembly shown in FIG. 14.

If, rather than a headrest, the assembly 12 is to accommodate an infant carrier, such as in FIG. 11, then the extending body 170, shown in FIGS. 19 and 21, are preferred. The structure of spaced protrusions 172 provides an open space 176 that has a width 178 configured to receive a lower portion of a conventional infant carrier 52. This is regardless of whether the protrusions 172 are constructed of an extended wire rod, as shown in FIG. 19A, or whether the lattice structure extends to the protrusions 172 to fill the space of the body 170, as in FIG. 19B. Thus, the top 46 of the seat back 44 is in general alignment with the top of the void region 102 to provide surfaces for the infant carrier 52, and the protrusions 172 are positioned on each side of the infant carrier to prevent lateral movement of the infant carrier 52.

An important feature of the extending body 170 is that it remain at an appropriate height above the basket 14, such that the extending body 170 does not extend below the handle 114. Because the embodiment of FIGS. 13-22 include an extending body 170, the total height of the collapsed assembly 12 is greater than in the embodiment if FIGS. 1-12. Therefore, it is important that the top of the seat back 44 remains above the handle 114, either due to supporting contact between the seat back 44 and the top of the rear gate 16 or with the handle 114 itself. As is shown in FIG. 22, the projections 172 may have a bend or curved shape 180 to facilitate the desired location of the extending body 170 in the area above (182) of the handle 114.

Figure 6:
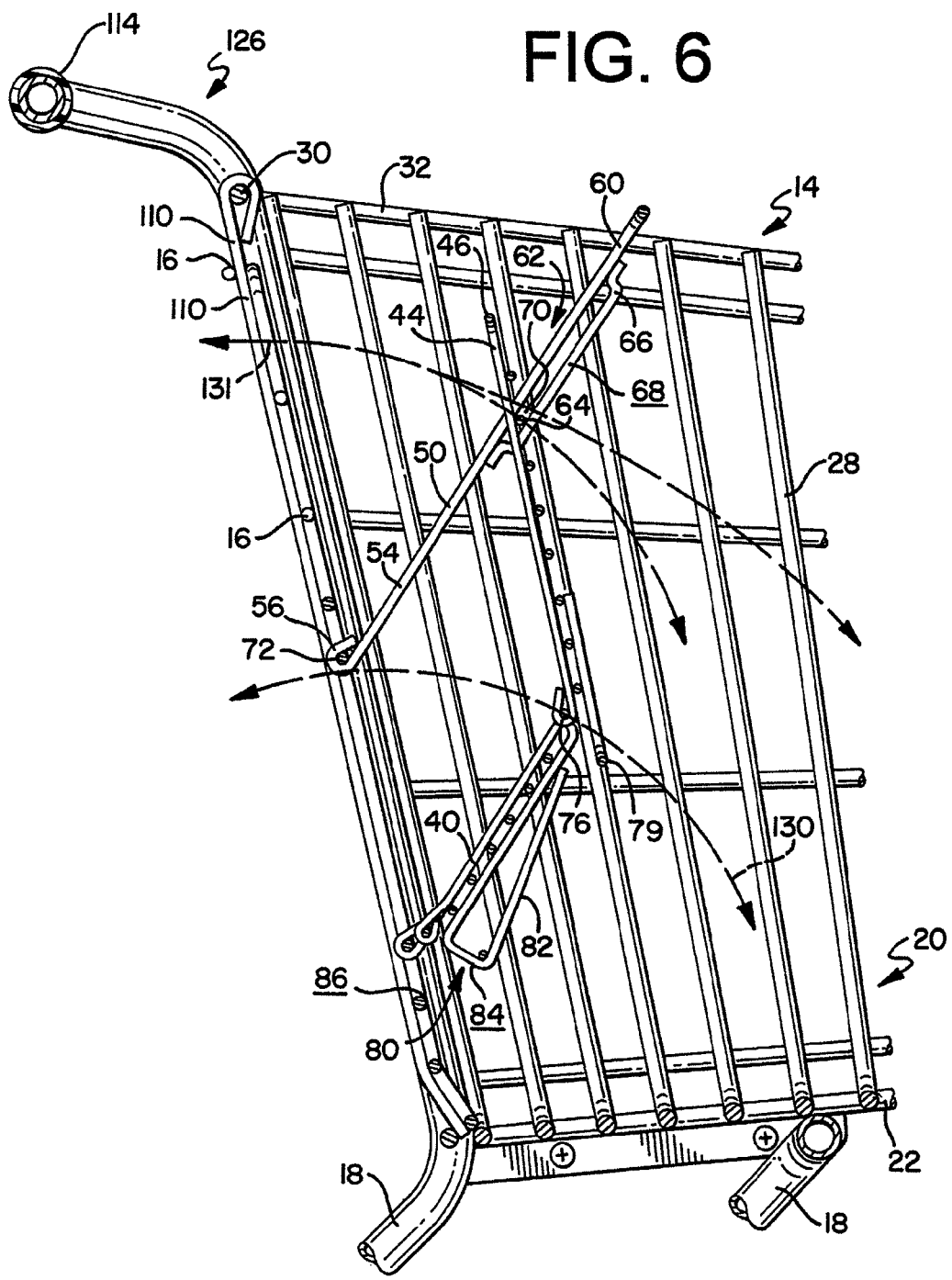
FIG. 6 is a sectional view of the assembly, in the same sectional view of FIGS. 4 and 5, wherein the seat assembly is in a position between the storage configuration (FIG. 4) and the use position (FIG. 5)

Further details of the structure and use of the present invention is shown by the structural comparison between FIGS. 2 and 4 as compared to FIGS. 3 and 5-6. As shown in these Figures, one aspect of the present invention is to provide a hinged connection of the seat in which the hinged connection 78 between seat bottom 40 and the seat back 44 travels in an upward arcuate path 130 when moved from the use position 38 to the non-use position 36 (see FIG. 6). In conventional cart assemblies with hinged connection between the seat bottom and the seat back, movement of the hinged connection of those parts moves along a general horizontal line, and does not move to an elevated height against the rear gate. In distinction, in the present invention, the hinged connection 78 between the seat back 44 and the seat bottom 40 move upward in the basket chamber 34 toward the top of the basket 32, as the assembly 12 is collapsed against the rear gate 16. Also, the seat assembly of the present invention is unique in that the hinged connection of the seat back to the support strut 50, which is located at the slide track arrangement 62, has a construction that permits movement of the hinged connection as the assembly is moved into the use position. This movement of the hinged connection between the seat back 44 and bottom 40 permits the hinge to move away from the rear gate as the seat is deployed for use. The structure of the present invention that permits such arcuate movement 131 of the hinge connection 48 is the extent of the sliding arrangement 62 between the seat back 44 and the support strut member 50.

As the seat back 44 is moved toward the rear gate 16, the seat back 44 moves upward, toward the basket top 32, due to movement of the hinged connection 76 of the seat back 44 to the strut member 50. This structure, and resulting arcuate path of hinged connection provides a child seat assembly which may be significantly lowered into use position 38 so the assembly 12 is located in the lower portion of the cart basket chamber. And this structure provides a seat assembly that is deployed for use and the seat back 44 is tilted back from the vertical plane to provide a reclining seat back 44.

Further, the present invention provides a structure that facilitates closing of the child seat from a use configuration to a storage configuration, primarily by the unique structure and movement of the strut members that are positioned above the seat bottom, and the interlocking connection of the seat bottom to the seat back.

While the specific embodiments have been illustrated and described, numerous modifications come to mind without significantly departing from the spirit of the invention and the scope of protection is only limited by the scope of the accompanying Claims.

What is claimed is:

1. A shopping cart and child seat assembly, comprising:
 a cart having a lower frame supporting a basket formed of a sidewall arrangement and a basket bottom;
 at least an extent of a sidewall of the basket having a gate, the gate having a gate height between the basket bottom and an upper hinge, the gate being pivotal about said hinge-to provide an opening of the basket sidewall arrangement for insertion of a portion of a similar shopping cart when stacking like carts together;
 a collapsible child seat assembly being positioned within the basket and having a seat bottom secured to a seat back at a hinged connection, wherein said child seat assembly is secured to said gate and movable between a storage configuration and a use configuration such that, when said child seat assembly is in the use configuration the seat bottom is positioned below two-thirds of said gate height;
 at least one strut member extends between the seat back and the rear gate and is positioned entirely above the seat bottom when the child seat assembly is in the use configuration, said strut member being connected to the seat back with a slideable hinge, wherein a hinged connection between the strut and the seat back is movable along a length of the strut member toward the rear gate.

2. The assembly of claim 1 wherein the slideable hinged connection of the strut member to the seat back comprises engagement between a slide component of the seat back and a track segment of the strut.

3. The assembly of claim 1 wherein the slideable hinged connection of the strut member with the seat back comprises engagement between a track segment of the seat back engaged with a track segment of the strut.

4. The assembly of claim 1 wherein the strut member at least partially supports the child seat and seat back in the use configuration without any support structure extending to the rear gate at a position below the seat bottom.

5. The assembly of claim 1 wherein the strut member is connected to the rear gate with a movable hinge, such that the hinged connection is configured to move upwardly along the rear gate as the assembly is moved from a use configuration to a non-use configuration.

6. A shopping cart rear gate and child carrier assembly configured for use within a basket of a shopping cart, comprising:

an elongated gate wall having an upper end configured to hingeably connect to a shopping cart and a lower edge, wherein a gate height extends between said upper and said lower edge;

a collapsible child seat assembly having a seat bottom comprising a platform secured to a seat back at a hinged connection, wherein said child seat assembly is secured to said gate wall and movable between a storage configuration and a use configuration such that, when said child seat assembly is in the use configuration the seat bottom platform resides generally along a horizontal plane between the gate and the seat back and positioned below two-thirds of said gate height;

a pair of support strut members, each extending between the gate wall and the seat back wherein each said strut member is connected to the gate wall above the seat bottom and connected to the seat back at a position above the seat bottom.

7. The assembly of claim 6 wherein each said strut member is positioned adjacent a side of the seat bottom and wherein the seat bottom and seat back is at least partially supported in a use configuration by the strut members when the seat back is positioned a distance away from the gate wall.

8. The assembly of claim 6 wherein at least one of said strut members is connected to the seat back by a movable hinge that is configured to move along a length of the strut member.

9. The assembly of claim 6 wherein the seat back and seat bottom are supported in said use configuration without a support member extending below the seat bottom toward the gate wall.

10. The assembly of claim 6 wherein at least one of said strut members is connected to the gate wall with a slide track arrangement.

11. The assembly of claim 6 wherein at least one of said strut members is connected to the seat back with a slide track arrangement.

* * * * *